United States Patent
Luo et al.

(10) Patent No.: US 12,058,486 B2
(45) Date of Patent: Aug. 6, 2024

(54) METHOD AND APPARATUS FOR IMPLEMENTING AUTOMATIC TRANSLATION BY USING A PLURALITY OF TWS HEADSETS CONNECTED IN FORWARDING MODE

(71) Applicant: Huawei Technologies Co., Ltd., Shenzhen (CN)

(72) Inventors: Haibin Luo, Shenzhen (CN); Wenbin Gu, Dongguan (CN)

(73) Assignee: Huawei Technologies Co., Ltd., Shenzhen (CN)

(*) Notice: Subject to any disclaimer, the term of this patent is extended or adjusted under 35 U.S.C. 154(b) by 547 days.

(21) Appl. No.: 17/278,008

(22) PCT Filed: Sep. 20, 2018

(86) PCT No.: PCT/CN2018/106762
§ 371 (c)(1),
(2) Date: Mar. 19, 2021

(87) PCT Pub. No.: WO2020/056684
PCT Pub. Date: Mar. 26, 2020

(65) Prior Publication Data
US 2021/0377642 A1 Dec. 2, 2021

(51) Int. Cl.
*H04R 1/32* (2006.01)
*G10L 15/22* (2006.01)
(Continued)

(52) U.S. Cl.
CPC ............ *H04R 1/1016* (2013.01); *G10L 15/22* (2013.01); *G10L 15/26* (2013.01); *G10L 15/30* (2013.01);
(Continued)

(58) Field of Classification Search
CPC ...... H04R 1/1016; H04R 1/1041; H04R 1/32; H04R 2201/107; H04R 2420/07; H04R 2420/13
See application file for complete search history.

(56) References Cited

U.S. PATENT DOCUMENTS

2009/0099836 A1  4/2009  Jacobsen et al.
2009/0125295 A1  5/2009  Drewes
(Continued)

FOREIGN PATENT DOCUMENTS

CN    1859145 A    11/2006
CN    201937800 U  8/2011
(Continued)

OTHER PUBLICATIONS

International Telecommunication Union, "Series H: Audiovisual and Multimedia Systems, Infrastructure of audiovisual services—Coding of moving video", Advanced video coding for generic audiovisual services, ITU-T H.264 (Apr. 2017), 812 pages.

*Primary Examiner* — Suhan Ni
(74) *Attorney, Agent, or Firm* — Slater Matsil, LLP

(57) ABSTRACT

An electronic device is connected to a master headset and a slave headset. The master headset performs talk right arbitration. A voice automatically picked up by a headset having a talk right may be uploaded to the electronic device. The electronic device translates the uploaded voice, and then returns a translation result.

20 Claims, 18 Drawing Sheets

(51) Int. Cl.
  *G10L 15/26* (2006.01)
  *G10L 15/30* (2013.01)
  *G10L 25/78* (2013.01)
  *H04R 1/10* (2006.01)

(52) U.S. Cl.
  CPC ............ *G10L 25/78* (2013.01); *H04R 1/1041* (2013.01); *H04R 1/32* (2013.01); *H04R 2201/107* (2013.01); *H04R 2420/07* (2013.01); *H04R 2460/13* (2013.01)

(56) References Cited

U.S. PATENT DOCUMENTS

| | | |
|---|---|---|
| 2015/0134322 A1 | 5/2015 | Cuthbert et al. |
| 2015/0169551 A1 | 6/2015 | Yun et al. |
| 2015/0326990 A1 | 11/2015 | Yeh et al. |
| 2016/0036962 A1* | 2/2016 | Rand ................... H04M 1/656 455/418 |
| 2017/0277507 A1* | 9/2017 | Ando ................... H04R 27/00 |

FOREIGN PATENT DOCUMENTS

| | | |
|---|---|---|
| CN | 104303177 A | 1/2015 |
| CN | 204929182 U | 12/2015 |
| CN | 105979421 A | 9/2016 |
| CN | 106060272 A | 10/2016 |
| CN | 106131349 A | 11/2016 |
| CN | 106412813 A | 2/2017 |
| CN | 106851450 A | 6/2017 |
| CN | 206341361 U | 7/2017 |
| CN | 107708006 A | 2/2018 |
| CN | 108345591 A | 7/2018 |
| CN | 108509428 A | 9/2018 |
| CN | 108513196 A | 9/2018 |
| WO | 2008016949 A2 | 2/2008 |

* cited by examiner

METHOD AND APPARATUS FOR IMPLEMENTING AUTOMATIC TRANSLATION BY USING A PLURALITY OF TWS HEADSETS CONNECTED IN FORWARDING MODE

CROSS-REFERENCE TO RELATED APPLICATIONS

This application is a National Stage of International Application No. PCT/CN2018/106762, filed on Sep. 20, 2018, which is hereby incorporated by reference in its entirety.

TECHNICAL FIELD

This application relates to the field of communications technologies, and in particular, to a control method and an electronic device.

BACKGROUND

At present, a mobile phone already has a capability of providing real-time bilingual translation for a user. For example, the mobile phone may download an application having a translation function (which is referred to as a "translation application" for short) from an application store. The translation application may pick up a user voice through a microphone of the mobile phone to perform translation. A translation result may be played through an earpiece or a speaker of the mobile phone, or displayed in a form of a text through a display of the mobile phone.

In an actual scenario, because there is only one uplink voice channel, users using different languages need to alternately use the mobile phone to implement real-time bilingual translation. For example, a user A first operates the mobile phone and enables a sound pickup function of the mobile phone, and the mobile phone picks up a voice of the user A. The user A further needs to select a to-be-translated language (namely, a language into which the voice of the user A is translated). The electronic device translates the picked-up voice of the user A, and plays a translation result in a form of a voice or displays the translation result on the display in the form of a text. The user A gives the mobile phone to a user B. The user B listens to a voice played by the mobile phone or views a text displayed on the mobile phone. Then, the user B operates the mobile phone to enable the sound pickup function of the mobile phone, and the mobile phone picks up a voice of the user B. The user B selects a to-be-translated language (namely, a language into which the voice of the user B is translated). The electronic device translates the picked-up voice of the user B, and plays a translation result in the form of a voice or displays the translation result on the display in the form of a text. This rule also applies to other cases.

It can be learned that, in a real-time bilingual translation process, the users need to alternately enable the sound pickup function. Consequently, a user operation is complex, and user experience is poor.

SUMMARY

This application provides a control method and an electronic device. Therefore, when there is only one uplink communication channel between a plurality of headsets and the electronic device, talk right arbitration can be automatically performed, and bilingual translation or even multilingual translation can be automatically implemented without participation of a user, thereby helping enhance user experience.

According to a first aspect, an embodiment of this application provides a control method, applicable to an electronic device. The electronic device is connected to a master headset and a slave headset. The master headset directly communicates with the electronic device, and the slave headset communicates with the electronic device through the master headset. The master headset and the slave headset each are equipped with a microphone. The method includes:

The master headset detects a voice of a first user. The master headset automatically picks up the voice of the first user in response to the detected voice of the first user. If the master headset determines that the master headset has a talk right, the master headset uploads the voice of the first user to the electronic device. The slave headset receives a first translation result through the master headset, and plays the first translation result. The first translation result is a result obtained by the electronic device by automatically translating the voice of the first user according to a setting for mutual translation between languages.

In some embodiments, the master headset and the slave headset may be a pair of headsets, for example, may be true wireless stereo (true wireless stereo, TWS) headsets. Two headsets (namely, left and right headsets) may be designed separately. To be specific, the pair of headsets may specifically include the master headset (which may directly communicate with the electronic device) and the slave headset (which cannot directly communicate with the electronic device, and needs to communicate with the electronic device through the master headset). The master headset and the slave headset each have independent sound pickup and sound playback functions. Therefore, the master headset and the slave headset may be respectively used by two users.

In this way, the electronic device may automatically pick up a voice of the user through the connected headset, and automatically translate the picked-up voice. It can be learned that in the technical solution provided in this embodiment of this application, a user operation is simplified, and user experience is enhanced. In addition, because the headset is used to pick up the voice, and the headset has a noise reduction capability, a sound pickup effect can be improved, and a translation effect of a mobile phone can also be improved.

In a possible implementation, that the master headset determines that the master headset has a talk right further includes: The master headset request the talk right from the electronic device; and the master headset receives a determining result returned by the electronic device after the electronic device determines that the master headset has the talk right.

In some embodiments of this application, a talk right arbitration module may be disposed on the master headset, and the talk right arbitration module of the master headset performs talk right arbitration. In other words, the master headset determines which headset has the talk right. In some other embodiments of this application, a talk right arbitration module may be disposed on the electronic device, and the talk right arbitration module of the electronic device performs talk right arbitration. This is not limited in this embodiment of this application.

In a possible implementation, the master headset or the electronic device determines, based on the following factors, whether the master headset has the talk right: After a preset time period in which neither the master headset nor the slave headset detects a user voice, if the master headset first detects the user voice, it is determined that the master headset has the talk right, and the slave headset does not have the talk right; or if the slave headset first detects the user voice, it is determined that the slave headset has the talk right, and the master headset does not have the talk right. Alternatively, when the master headset has the talk right, it is determined that the master headset has the talk right within the preset time period in which the master headset does not detect the user voice; and it is determined that the master headset does not have the talk right after the preset time period in which the master headset does not detect the user voice.

Optionally, after determining whether a headset 1 (which may be the master headset or the slave headset) has the talk right, the master headset or the electronic device may prompt the user of a talk right arbitration result (shown in step S104b in FIG. 4). Specifically, in some embodiments, after determining whether the headset 1 has the talk right, the master headset may play a prompt tone through the headset 1, to prompt the user whether the headset 1 has the talk right. For example, a case in which the headset 1 has the talk right and a case in which the headset 1 does not have the talk right may be indicated by playing different prompt tones. For another example, when the headset 1 has the talk right, a prompt tone is played; and when the headset 1 does not have the talk right, no prompt tone is played. Alternatively, when the headset 1 does not have the talk right, a prompt tone is played; and when the headset 1 has the talk right, no prompt tone is played. In some other embodiments, after determining whether the headset 1 has the talk right, the master headset may alternatively display the talk right arbitration result, play different animations, or the like through the electronic device, to prompt the user. A manner of prompting the talk right arbitration result is not limited in this embodiment of this application.

In a possible implementation, the setting for mutual translation between languages includes: The master headset corresponds to a first language, and the slave headset corresponds to a second language. That the electronic device automatically translates the voice of the first user according to the setting for mutual translation between languages, to obtain the first translation result specifically includes: The electronic device automatically converts the voice of the first user into a first text, where the first text corresponds to the first language. The electronic device automatically translates the first text into a second text, where the second text corresponds to the second language. The electronic device converts the second text into a voice, to obtain the first translation result.

Optionally, the electronic device may alternatively prompt the user to set a translation language or modify a default translation language before a first translation (the two users start a dialog). Then, during communication between the two users, the translation language does not need to be switched. This is because, through talk right arbitration provided in this embodiment of this application, a user who currently speaks (namely, a user who has the talk right) may be automatically identified, and with reference to the default translation language of the electronic device or the translation language set by the user, a language into which a voice of the user who currently speaks needs to be translated can be automatically determined. Therefore, the user does not need to manually switch the translation language.

In a possible implementation, the method further includes: If the master headset determines that the master headset does not have the talk right, the master headset does not upload the voice of the first user to the electronic device.

In a possible implementation, the method further includes: The slave headset detects a voice of a second user. The slave headset automatically picks up the voice of the second user in response to the detected voice of the second user.

The slave headset requests the talk right from the master headset. The master headset sends a determining result to the slave headset if the master headset determines that the slave headset has the talk right. The slave headset receives the determining result, and uploads the voice of the second user to the electronic device through the master headset. The master headset receives and plays a second translation result. The second translation result is a result obtained by the electronic device by automatically translating the voice of the second user according to the setting for mutual translation between languages.

In a possible implementation, that the master headset sends a determining result to the slave headset if the master headset determines that the slave headset has the talk right further includes: The master headset requests the talk right of the slave headset from the electronic device. The master headset receives a determining result returned by the electronic device after the electronic device determines that the slave headset has the talk right. The master headset sends the determining result to the slave headset.

In a possible implementation, the master headset or the electronic device determines, based on the following factors, whether the slave headset has the talk right: After a preset time period in which neither the master headset nor the slave headset detects a user voice, if the master headset first detects the user voice, it is determined that the master headset has the talk right, and the slave headset does not have the talk right; or if the slave headset first detects the user voice, it is determined that the slave headset has the talk right, and the master headset does not have the talk right. Alternatively, when the slave headset has the talk right, it is determined that the slave headset has the talk right within the preset time period in which the slave headset does not detect the user voice; and it is determined that the slave headset does not have the talk right after the preset time period in which the slave headset does not detect the user voice.

In a possible implementation, the setting for mutual translation between languages includes: The master headset corresponds to a first language, and the slave headset corresponds to a second language. That the electronic device automatically translates the voice of the second user according to the setting for mutual translation between languages, to obtain the second translation result specifically includes: The electronic device automatically converts the voice of the second user into a third text, where the third text corresponds to the second language. The electronic device automatically translates the third text into a fourth text, where the fourth text corresponds to the first language. The electronic device converts the fourth text into a voice, to obtain the second translation result.

According to a second aspect, a control method is provided, and may be applied to an electronic device. The electronic device is connected to a master headset and a slave headset. The master headset directly communicates with the electronic device, and the slave headset communicates with the electronic device through the master headset. The method includes: The electronic device displays a first interface. The first interface displays a first control and a second control. The first control corresponds to the master headset, and the second control corresponds to the slave headset. In response to detecting that the master headset has a voice input, the electronic device displays prompt information on the first interface, to indicate that a voice is input to the master headset. The electronic device automatically displays a second interface (including all elements on the first interface) in response to determining that the master headset has a talk right. A first control on the second interface displays first prompt information, to prompt a user that the master headset has the talk right. In response to detecting that the slave headset has a voice input, the electronic device displays prompt information on the first interface, to indicate that a voice is input to the slave headset. The electronic device automatically displays a third interface (including all the elements on the first interface) in response to determining that the slave headset has the talk right. A second control on the third interface displays second prompt information, to prompt the user that the slave headset has the talk right. The electronic device automatically displays a fourth interface (including all the elements on the first interface) in response to determining that neither the master headset nor the slave headset has the talk right. The fourth interface displays third prompt information, to prompt the user that neither the master headset nor the slave headset has the talk right.

In some embodiments, when the electronic device just enters a face-to-face translation interface, neither the master headset nor the slave headset detects a user voice. In this case, neither the master headset nor the slave headset has the talk right. In this scenario, the first interface may be the face-to-face translation interface that the electronic device has just entered. For example, the first interface may be an interface 307 shown in FIG. 6(d). The first control may be a display area of an area 308, and the second control may be a display area of an area 309. Alternatively, the first interface may be, for example, an interface 401 shown in FIG. 7(a). The first control and the second control are icons corresponding to left and right headsets. Optionally, in this case, when neither the master headset nor the slave headset has the talk right, the electronic device may display the prompt information, to prompt that neither the master headset nor the slave headset has the talk right. An interface displaying the prompt information is the fourth interface. Optionally, in this case, the electronic device may not display the prompt information until the electronic device or the master headset determines a headset having the talk right, and then displays corresponding prompt information.

In other words, one of the master headset and the slave headset that first detects the user voice has the talk right. If the master headset first detects the user voice, the master headset or the electronic device may determine that the master headset has the talk right. In this case, the electronic device may display the second interface, and the first control on the second interface shows that the master headset has the talk right. If the slave headset first detects the user voice, the master headset or the electronic device may determine that the slave headset has the talk right. In this case, the electronic device may display the third interface, and the second control on the third interface shows that the slave headset has the talk right.

In some other embodiments, the first interface may alternatively be an interface of the electronic device in a translation process. For example, the first interface may be an interface 409 shown in FIG. 7(e), and the fourth interface may be an interface 413 shown in FIG. 7(f). In still some other embodiments, the first interface may alternatively be an interface before the talk right changes. After the talk right changes, the electronic device displays a corresponding interface, to prompt the user of a situation after the talk right changes. The first interface is not limited in this embodiment of this application.

In a possible implementation, the electronic device may determine, based on the following factors, whether the master headset and the slave headset have the talk right: After a preset time period in which neither the master headset nor the slave headset detects the user voice, if the master headset first detects the user voice, it is determined that the master headset has the talk right, and the slave headset does not have the talk right; or if the slave headset first detects the user voice, it is determined that the slave headset has the talk right, and the master headset does not have the talk right. Alternatively, when the master headset has the talk right, it is determined that the master headset has the talk right within the preset time period in which the master headset does not detect the user voice; and it is determined that the master headset does not have the talk right after the preset time period in which the master headset does not detect the user voice. Alternatively, when the slave headset has the talk right, it is determined that the slave headset has the talk right within the preset time period in which the slave headset does not detect the user voice; and it is determined that the slave headset does not have the talk right after the preset time period in which the slave headset does not detect the user voice.

In a possible implementation, after the electronic device automatically displays the second interface, the electronic device automatically translates a user voice picked up by the master headset, to obtain a first translation result. The electronic device automatically displays a fifth interface (including all elements on the second interface). The fifth interface displays the first translation result. Alternatively, after the electronic device automatically displays the third interface, the electronic device automatically translates a user voice picked up by the slave headset, to obtain a second translation result. The electronic device automatically displays a sixth interface (including all elements on the third interface). The sixth interface displays the second translation result.

In a possible implementation, the fifth interface further displays text information converted by the electronic device based on the user voice picked up by the master headset, or the sixth interface displays text information converted by the electronic device based on the user voice picked up by the slave headset.

In a possible implementation, the fifth interface further displays a third control. The electronic device detects an operation performed by the user on the third control. In response to the operation performed by the user on the third control, the electronic device displays a seventh interface (including all the elements on the third interface). The seventh interface displays the text information converted by the electronic device based on the user voice picked up by the master headset.

Alternatively, the sixth interface further displays a fourth control. The electronic device detects an operation performed by the user on the fourth control. In response to the operation performed by the user on the fourth control, the electronic device displays an eighth interface (including all elements on the fourth interface). The eighth interface displays the text information converted by the electronic device based on the user voice picked up by the slave headset.

According to a third aspect, a headset is provided, including a bone vibration sensor, a communications module, a processor, a microphone, and an earpiece. The bone vibration sensor is configured to detect a voice of a first user. The microphone is configured to automatically pick up the voice of the first user in response to the detected voice of the first user. The processor is configured to: determine whether the headset has a talk right; when determining that the headset currently has the talk right, indicate the communications module to upload the voice of the first user to an electronic device connected to the headset; receive talk right arbitration requests of one or more slave headsets; arbitrate the talk right arbitration requests to obtain an arbitration result; and indicate the communications module to return the arbitration result to the one or more slave headsets. The communications module is configured to: upload, according to an instruction of the processor, the voice of the first user to the electronic device connected to the headset; receive a first translation result from the electronic device, where the first translation result is a result obtained by the electronic device by automatically translating the voice of the first user according to a setting for mutual translation between languages; send the first translation result to the earpiece; receive voice information from the one or more slave headsets; upload the voice information to the electronic device, and forward, to the one or more slave headsets, a second translation result sent by the electronic device. The earpiece is configured to play the first translation result.

In a possible implementation, the processor determines, based on the following factors, whether the headset or the one or more slave headsets have the talk right: After a preset time period in which neither the bone vibration sensor of the headset nor bone vibration sensors of the one or more slave headsets detect a user voice, if the bone vibration sensor of the headset first detects the user voice, it is determined that the headset has the talk right, and the one or more slave headsets do not have the talk right; or if the bone vibration sensor of any one of the slave headsets first detects the user voice, it is determined that the slave headset that first detects the user voice has the talk right, and the headset does not have the talk right. Alternatively, when the headset has the talk right, it is determined that the headset has the talk right within the preset time period in which the bone vibration sensor of the headset does not detect the user voice; and it is determined that the headset does not have the talk right after the preset time period in which the bone vibration sensor of the headset does not detect the user voice. Alternatively, when any one of the slave headsets has the talk right, it is determined that the slave headset having the talk right has the talk right within the preset time period in which the bone vibration sensor of the slave headset does not detect the user voice; and it is determined that the slave headset having the talk right no longer has the talk right after the preset time period in which the bone vibration sensor of the slave headset having the talk right does not detect the user voice.

In a possible implementation, the communications module is further configured to: when the processor determines that the master headset does not have the talk right, skip uploading the voice of the first user to the electronic device connected to the headset.

According to a fourth aspect, an electronic device is provided, including a processor, a memory, and a touchscreen. The memory and the touchscreen are coupled to the processor. The memory is configured to store computer program code, and the computer program code includes a computer instruction. When the processor reads the computer instruction from the memory, the electronic device is enabled to perform the following operations: The touchscreen is configured to display a first interface. The first interface displays a first control and a second control. The first control corresponds to a master headset, and the second control corresponds to a slave headset. The master headset is connected to the electronic device, and the slave headset is connected to the electronic device through the master headset. The processor is configured to: when determining that the master headset has a talk right, indicate the touchscreen to display a second interface, where the second interface displays first prompt information, to prompt a user that the master headset has the talk right; or when determining that the slave headset has the talk right, indicate the touchscreen to display a third interface, where the third interface displays second prompt information, to prompt the user that the slave headset has the talk right; or when determining that neither the master headset nor the slave headset has the talk right, indicate the touchscreen to display a fourth interface, where the fourth interface displays third prompt information, to prompt the user that neither the master headset nor the slave headset has the talk right.

In a possible implementation, the processor may determine, based on the following factors, whether the master headset or the slave headset has the talk right: After a preset time period in which neither the master headset nor the slave headset detects a user voice, if the master headset first detects the user voice, it is determined that the master headset has the talk right, and the slave headset does not have the talk right; or if the slave headset first detects the user voice, it is determined that the slave headset has the talk right, and the master headset does not have the talk right. Alternatively, when the master headset has the talk right, it is determined that the master headset has the talk right within the preset time period in which the master headset does not detect the user voice; and it is determined that the master headset does not have the talk right after the preset time period in which the master headset does not detect the user voice. Alternatively, when the slave headset has the talk right, it is determined that the slave headset has the talk right within the preset time period in which the slave headset does not detect the user voice; and it is determined that the slave headset does not have the talk right after the preset time period in which the slave headset does not detect the user voice.

In a possible implementation, the processor is further configured to: after the touchscreen displays the second interface, automatically translate a user voice picked up by the master headset to obtain a first translation result, and indicate the touchscreen to display a fifth interface, where the fifth interface displays the first translation result; or after the touchscreen displays the third interface, automatically translate a user voice picked up by the slave headset to obtain a second translation result, and indicate the touchscreen to display a sixth interface, where the sixth interface displays the second translation result.

In a possible implementation, the fifth interface further displays text information converted by the electronic device based on the user voice picked up by the master headset, or the sixth interface displays text information converted by the electronic device based on the user voice picked up by the slave headset.

In a possible implementation, the fifth interface further displays a third control. The touchscreen is further configured to detect an operation performed by the user on the third control. The processor is further configured to: in response to the operation performed by the user on the third control, indicate the touchscreen to display a seventh interface. The seventh interface displays the text information converted by the processor based on the user voice picked up by the master headset. Alternatively, the sixth interface further displays a fourth control. The touchscreen is further configured to detect an operation performed by the user on the fourth control. The processor is further configured to: in response to the operation performed by the user on the fourth control, indicate the touchscreen to display an eighth interface. The eighth interface displays the text information converted by the processor based on the user voice picked up by the slave headset.

According to a fifth aspect, an electronic device is provided, including a microphone, an earpiece, a processor, and a memory. The microphone, the earpiece, and the memory are coupled to the processor. The microphone is configured to pick up a voice. The earpiece is configured to play audio information. The memory is configured to store computer program code, and the computer program code includes a computer instruction. When the processor reads the computer instruction from the memory, the electronic device is enabled to perform the control method according to any one of the first aspect and the possible implementations of the first aspect.

According to a sixth aspect, an electronic device is provided, including a processor, a memory, and a touchscreen. The memory and the touchscreen are coupled to the processor. The memory is configured to store computer program code, and the computer program code includes a computer instruction. When the processor reads the computer instruction from the memory, the electronic device is enabled to perform the control method according to any one of the second aspect and the possible implementations of the second aspect.

According to a seventh aspect, a computer storage medium is provided, including a computer instruction. When the computer instruction is run on an electronic device, the electronic device is enabled to perform the control method according to any one of the first aspect and the possible implementations of the first aspect.

According to an eighth aspect, a computer storage medium is provided, including a computer instruction. When the computer instruction is run on an electronic device, the electronic device is enabled to perform the control method according to any one of the second aspect and the possible implementations of the second aspect.

According to a ninth aspect, a computer program product is provided. When the computer program product is run on a computer, the computer is enabled to perform the method according to any one of the first aspect and the possible implementations of the first aspect.

According to a tenth aspect, a computer program product is provided. When the computer program product is run on a computer, the computer is enabled to perform the method according to any one of the second aspect and the possible implementations of the second aspect.

DETAILED DESCRIPTION OF ILLUSTRATIVE EMBODIMENTS

Figure 1:
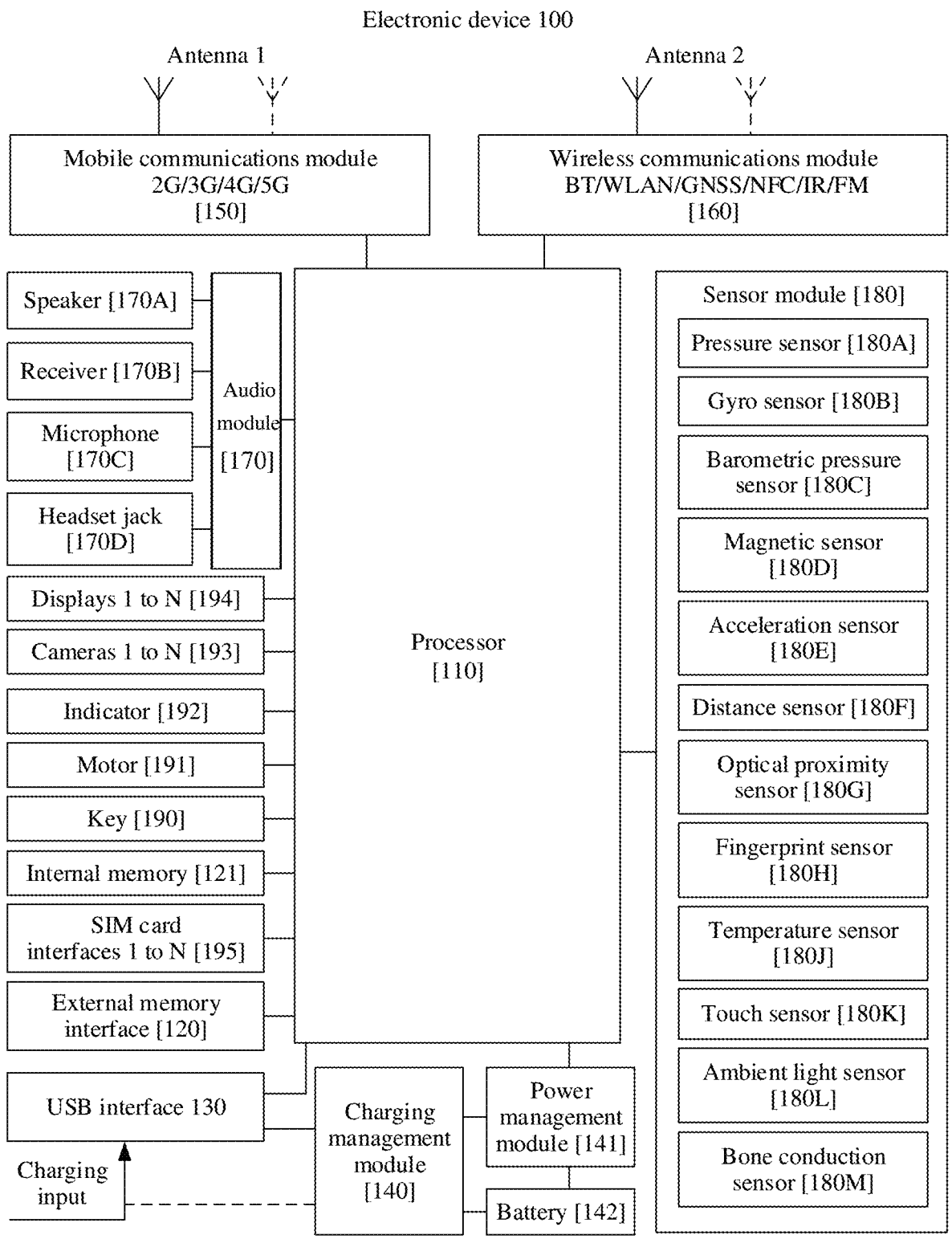
FIG. 1 is a schematic diagram 1 of a structure of an electronic device according to an embodiment of this application.

In the prior art, two users need to alternately use a mobile phone, for example, manually enable a sound pickup function of the mobile phone, and pick up a voice of the users through a microphone of the mobile phone. In addition, a translation language needs to be manually switched, so that the mobile phone can translate the picked-up voice. On one hand, it is very inconvenient for the users to alternately use the mobile phone. A user operation is complex, and user experience is poor. On another hand, because a sound pickup effect of the microphone of the mobile phone is easily affected by an ambient sound, an effect of the microphone of the mobile phone in picking up a user voice is poor. This may affect a translation effect of the mobile phone.

Therefore, embodiments of this application provide a translation method, which may be applied to an electronic device that can be connected to a headset, and left and right headsets are separately used by different users. Alternatively, the method is applied to an electronic device that can be connected to a master headset and a slave headset, and the master headset and the slave headset are separately used by different users. In the embodiments of this application, when detecting that there is a voice input, the master and slave headsets automatically enable a sound pickup function. The master headset or the electronic device determines which headset has a talk right, so that a voice signal of the headset can be uploaded to the electronic device for translation processing. In this way, a translation function can be smoothly implemented without needs for the users to manually enable sound pickup and alternately use the headset or the mobile phone. It can be learned that according to the technical solutions provided in the embodiments of this application, a user operation can be simplified, and a specific headset whose voice information can be transmitted to the electronic device through the only one voice channel between the headset and the electronic device within a time period is intelligently determined. This helps enhance user experience. In addition, because the headset is used to pick up the voice, and the headset has a noise reduction capability, a sound pickup effect can be improved, and the translation effect of the mobile phone can also be improved.

The following describes the technical solutions in the embodiments of this application with reference to accompanying drawings in the embodiments of this application. In descriptions of the embodiments of this application, "/" means "or" unless otherwise specified. For example, A/B may represent A or B. In this specification, "and/or" describes only an association for describing associated objects and represents that three relationships may exist. For example, A and/or B may represent the following three cases: Only A exists, both A and B exist, and only B exists.

The terms "first" and "second" mentioned below are merely intended for description, and shall not be understood as an indication or implication of relative importance or implicit indication of a quantity of indicated technical features. Therefore, a feature limited by "first" or "second" may explicitly or implicitly include one or more features. In the descriptions of the embodiment of this application, unless otherwise stated, "a plurality of" means two or more than two.

For example, the electronic device in this application may be a mobile phone, a tablet computer, a personal computer (Personal Computer, PC), a personal digital assistant (personal digital assistant, PDA), a smartwatch, a netbook, a wearable electronic device, an augmented reality (Augmented Reality, AR) device, a virtual reality (Virtual Reality, VR) device, a vehicle-mounted device, a smart automobile, a smart speaker, a robot, or the like. This application imposes no special limitation on a specific form of the electronic device.

FIG. 1 is a schematic diagram of a structure of an electronic device 100.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a key 190, a motor 191, an indicator 192, a camera 193, a display 194, a subscriber identity module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural network processing unit (neural-network processing unit, NPU), and/or the like. Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

The memory may further be disposed in the processor 110, and is configured to store an instruction and data. In some embodiments, the memory in the processor 110 is a cache memory. The memory may store an instruction or data just used or cyclically used by the processor 110. If the processor 110 needs to use the instruction or the data again, the processor 110 may directly invoke the instruction or the data from the memory. This avoids repeated access and reduces a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to perform audio communication, and sample, quantize, and code an analog signal. In some embodiments, the audio module 170 may be coupled to the wireless communications module 160 through a PCM bus interface. In some embodiments, the audio module 170 may alternatively transmit the audio signal to the wireless communications module 160 through the PCM interface, to implement the function of answering a call by using the Bluetooth headset. Both the I2S interface and the PCM interface may be configured for audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using the Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured through software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB interface 130 is an interface that complies with a USB standard specification, and may be specifically a mini USB interface, a micro USB interface, a USB Type-C interface, or the like. The USB interface 130 may be configured to connect to a charger to charge the electronic device 100, or may be configured to transmit data between the electronic device 100 and a peripheral device, or may be configured to connect to a headset to play audio by using the headset. Alternatively, the interface may be configured to connect to another electronic device such as an AR device.

It may be understood that an interface connection relationship between the modules shown in this embodiment of the present invention is merely an example for description, and does not constitute a limitation on the structure of the electronic device 100. In some other embodiments of this application, the electronic device 100 may alternatively use an interface connection manner different from an interface connection manner in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input from a wired charger through the USB interface 130. In some embodiments of wireless charging, the charging management module 140 may receive a wireless charging input by using a wireless charging coil of the electronic device 100. The charging management module 140 supplies power to the electronic device by using the power management module 141 while charging the battery 142.

The power management module 141 is configured to connect to the battery 142 and the charging management module 140 to the processor 110. The power management module 141 receives an input from the battery 142 and/or the charging management module 140, and supplies power to the processor 110, the internal memory 121, an external memory, the display 194, the camera 193, the wireless communications module 160, and the like. The power management module 141 may further be configured to monitor parameters such as a battery capacity, a quantity of battery cycles, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may further be multiplexed to improve antenna utilization. For example, the antenna 1 may be multiplexed as a diversity antenna in a wireless local area network. In some other embodiments, an antenna may be used in combination with a tuning switch.

The mobile communications module 150 may provide a solution that is applied to the electronic device 100 and that includes wireless communications technologies such as 2G, 3G, 4G, and 5G. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communications module 150 or another function module.

The wireless communications module 160 may provide wireless communication solutions applied to the electronic device 100, including a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), an infrared (infrared, IR) technology, and the like. The wireless communications module 160 may be one or more devices that integrate at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 of the electronic device 100 is coupled to the mobile communications module 150, and the antenna 2 is coupled to the wireless communications module 160, so that the electronic device 100 may communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or satellite based augmentation systems (satellite based augmentation systems, SBAS).

The electronic device 100 implements a display function by using the GPU, the display 194, the application processor, and the like. The GPU is a microprocessor for image processing, and connects the display 194 to the application processor. The GPU is configured to perform mathematical and geometric calculation, and render an image. The processor 110 may include one or more GPUs that execute a program instruction to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini LED, a micro LED, a micro OLED, quantum dot light emitting diodes (quantum dot light emitting diodes, QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation and the like on frequency energy.

The video codec is configured to compress or decompress a digital video. The electronic device 100 may support one or more types of video codecs. In this way, the electronic device 100 can play or record videos in a plurality of encoding formats, for example, moving picture experts group (moving picture experts group, MPEG) 1, MPEG 2, MPEG 3, MPEG 4, and the like.

The NPU is a neural-network (neural-network, NN) computing processor. The NPU quickly processes input information with reference to a structure of a biological neural network, for example, with reference to a transfer mode between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer executable program code. The executable program code includes an instruction. The processor 110 runs the instruction stored in the internal memory 121 to perform various function applications of the electronic device 100 and process data. The internal memory 121 may include a program storage area and a data storage area. The program storage area may store an operating system, an application required by at least one function (for example, a sound playing function or an image playing function), and the like. The data storage area may store data (for example, audio data, a phone book, and the like) created in a process of using the electronic device 100, and the like. In addition, the internal memory 121 may include a high-speed random access memory, and may further include a nonvolatile memory, for example, at least one magnetic disk storage device, a flash memory device, or a universal flash storage (universal flash storage, UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may further be configured to code and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The electronic device 100 may be configured to listen to music or answer a hands-free call by using the speaker 170A.

The receiver 170B, also referred to as an "earpiece", is configured to convert an audio electrical signal into a sound signal. When a call is answered or voice information is received by using the electronic device 100, the receiver 170B may be put close to a human ear to receive a voice.

The microphone 170C, also referred to as a "mike" or a "microphone", is configured to convert a sound signal into an electrical signal. When making a call or sending voice information, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to implement a noise reduction function, in addition to collecting a sound signal. In some other embodiments, three, four, or more microphones 170C may alternatively be disposed in the electronic device 100, to collect a sound signal and reduce noise. The microphones may further identify a sound source, to implement a directional recording function, and the like.

The headset jack 170D is configured to connect to a wired headset. The headset jack 170D may be the USB interface 130 or a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, for example, a resistive pressure sensor, an inductive pressure sensor, a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a change of the capacitance. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on an SMS message application icon, an instruction for creating a new SMS message is executed.

The gyro sensor 180B may be configured to determine a motion posture of the electronic device 100. In some embodiments, an angular velocity of the electronic device 100 around three axes (namely, axes x, y, and z) may be determined by using the gyro sensor 180B. The gyro sensor 180B may be configured to perform image stabilization during photographing. For example, when the shutter is pressed, the gyro sensor 180B detects an angle at which the electronic device 100 shakes, and calculates, based on the angle, a distance for which a lens module needs to compensate, so that the lens cancels the shake of the electronic device 100 through reverse motion, to implement image stabilization. The gyro sensor 180B may further be used in navigation and motion sensing game scenarios.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall sensor. The electronic device 100 may detect opening and closing of a flip leather case by using the magnetic sensor 180D. In some embodiments, when the electronic device 100 is a clamshell phone, the electronic device 100 may detect opening and closing of a flip cover by using the magnetic sensor 180D. Further, a feature such as automatic unlocking of the flip cover is set based on a detected opening or closing state of the leather case or a detected opening or closing state of the flip cover.

The acceleration sensor 180E may detect magnitude of accelerations in various directions (usually on three axes) of the electronic device 100, and may detect magnitude and a direction of the gravity when the electronic device 100 is still. The acceleration sensor 180E may further be configured to identify a posture of the electronic device, and is applied to an application such as switching between landscape mode and portrait mode or a pedometer.

The distance sensor 180F is configured to measure a distance. The electronic device 100 may measure the distance in an infrared or a laser manner. In some embodiments, in a photographing scenario, the electronic device 100 may measure a distance by using the distance sensor 180F, to implement quick focusing.

For example, the optical proximity sensor 180G may include a light emitting diode (LED) and an optical detector, for example, a photodiode. The light emitting diode may be an infrared light emitting diode. The electronic device 100 emits infrared light by using the light emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically perform screen-off for power saving. The optical proximity sensor 180G may also be used in a smart cover mode or a pocket mode to automatically perform screen unlocking or locking.

In this embodiment of this application, any one or more of the gyro sensor, the acceleration sensor, the optical proximity sensor, and the like may be configured for the headset connected to the electronic device, to detect a running status of the headset and further determine whether the user wears the headset.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 degrades performance of a processor near the temperature sensor 180J, to reduce power consumption and implement thermal protection. In some other embodiments, when the temperature is lower than another threshold, the electronic device 100 heats up the battery 142, to avoid abnormal shutdown of the electronic device 100 due to a low temperature. In some other embodiments, when the temperature is lower than still another threshold, the electronic device 100 boosts an output voltage of the battery 142 to avoid abnormal shutdown due to a low temperature.

The touch sensor 180K is also referred to as a "touch panel". The touch sensor 180K may be disposed on the display 194, and the touch sensor 180K and the display 194 form a touchscreen, which is also referred to as a "touchscreen". The touch sensor 180K is configured to detect a touch operation performed on or near the touch sensor 180K. The touch sensor may transfer the detected touch operation to the application processor, to determine a type of the touch event. A visual output related to the touch operation may be provided by using the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse to receive a blood pressure beating signal. In some embodiments, the bone conduction sensor 180M may alternatively be disposed in the headset to form a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

In this embodiment of this application, the bone conduction sensor or the bone vibration sensor may be disposed in the headset, and may be configured to detect a skeleton vibration signal of a person wearing the headset, so as to determine whether the person wears the headset, whether the person wearing the headset starts to speak, and whether the person stops speaking.

The key 190 includes a power key, a volume key, and the like. The key 190 may be a mechanical key or a touch key. The electronic device 100 may receive a key input, and generate a key signal input related to a user setting and function control of the electronic device 100.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, a game) may also correspond to different vibration feedback effects. A touch vibration feedback effect may further be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted in the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted in a same SIM card interface 195. The plurality of cards may be of a same type or of different types. The SIM card interface 195 may also be compatible with different types of SIM cards. The SIM card interface 195 may also be compatible with an external storage card. The electronic device 100 interacts with a network through the SIM card, to implement functions such as calling and data communication. In some embodiments, the electronic device 100 uses an eSIM, namely, an embedded SIM card. The eSIM card may be embedded in the electronic device 100, and cannot be separated from the electronic device 100.

A software system of the electronic device 100 may use a layered architecture, an event-driven architecture, a microkernel architecture, a micro service architecture, or a cloud architecture. In this embodiment of the present invention, an Android system with the layered architecture is used as an example to illustrate a software structure of the electronic device 100.

Figure 2:
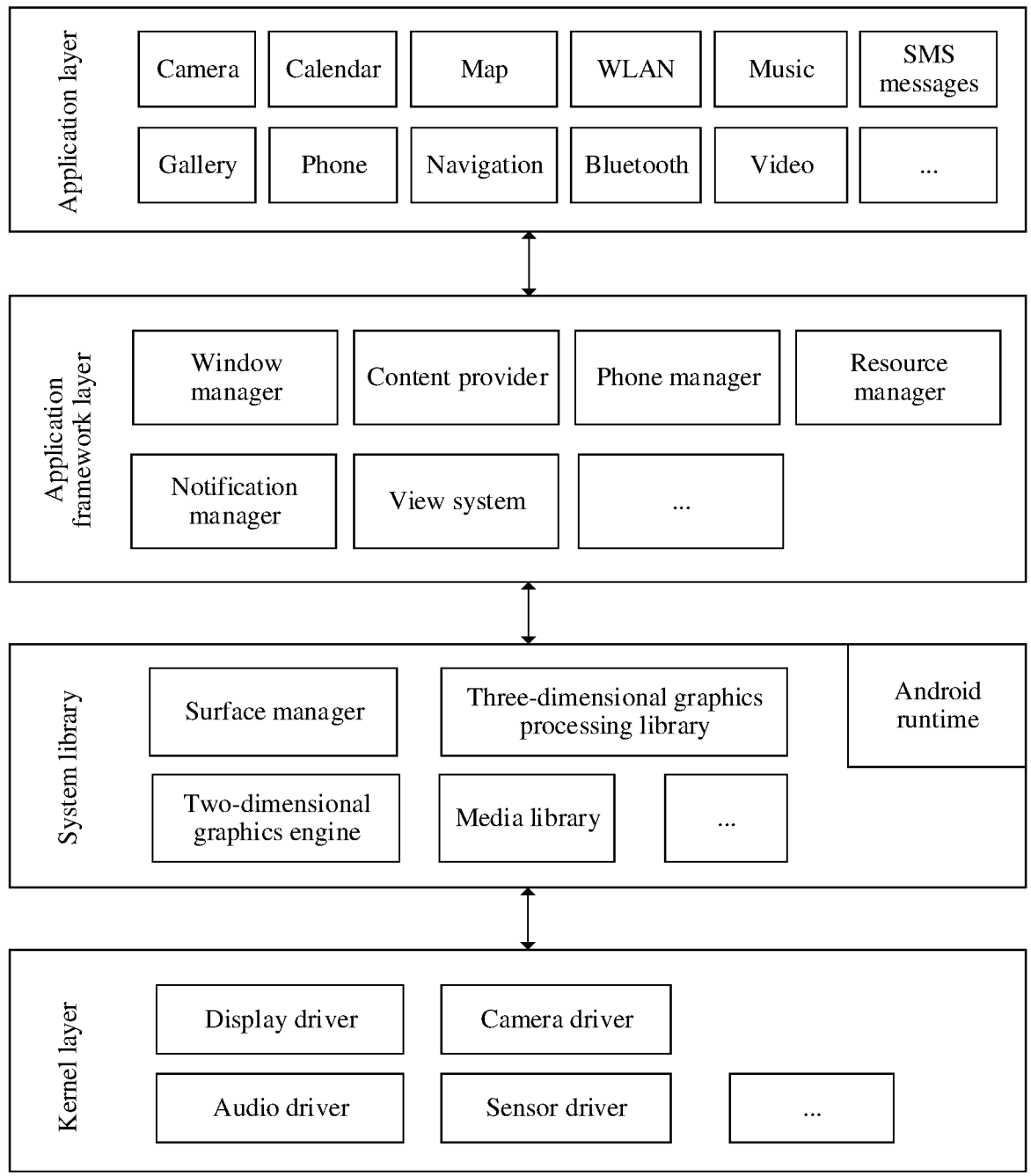
FIG. 2 is a schematic diagram 2 of a structure of an electronic device according to an embodiment of this application.

FIG. 2 is a block diagram of the software structure of the electronic device 100 according to an embodiment of the present invention.

In the layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 2, the application package may include applications such as "camera", "gallery", "calendar", "calls", "maps", "navigation", "WLAN", "Bluetooth", "music", "videos", and "SMS messages".

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application. The data may include a video, an image, audio, calls that are made and received, a browsing history and bookmarks, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is configured to provide a communication function of the electronic device 100, for example, management of a call status (including answering, declining, or the like).

The resource manager provides various resources for an application, such as a localized character string, an icon, an image, a layout file, and a video file.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application program running on a background or a notification that appears on the screen in a form of a dialog window. For example, text information is prompted in the status bar, a prompt tone is produced, the electronic device vibrates, or an indicator light blinks.

The Android runtime includes a core library and a virtual machine. The Android runtime is responsible for scheduling and management of the Android system.

The core library includes two parts: a function that needs to be invoked in Java and a core library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (Media Libraries), a three-dimensional graphics processing library (for example, OpenGL ES), and a 2D graphics engine (for example, SGL).

The surface manager is configured to manage a display subsystem and provide fusion of 2D and 3D image layers for a plurality of applications.

The media library supports playback and recording of a plurality of commonly used audio and video formats, static image files, and the like. The media library may support a plurality of audio and video coding formats such as MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working process of software and hardware of the electronic device 100 with reference to a photographing scenario.

When the touch sensor 180K receives a touch operation, a corresponding hardware interruption is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. An example in which the touch operation is a touch tap operation, and a control corresponding to the tap operation is a control of a camera application icon is used. The camera application invokes an interface at the application framework layer to enable the camera application, then enables a camera driver by invoking the kernel layer, and captures a static image or a video through the camera 193.

All technical solutions in the following embodiments may be implemented on the electronic device 100 that has the foregoing hardware architecture and software architecture.

The following describes in detail the technical solutions provided in the embodiments of this application with reference to the accompanying drawings.

Figure 3:
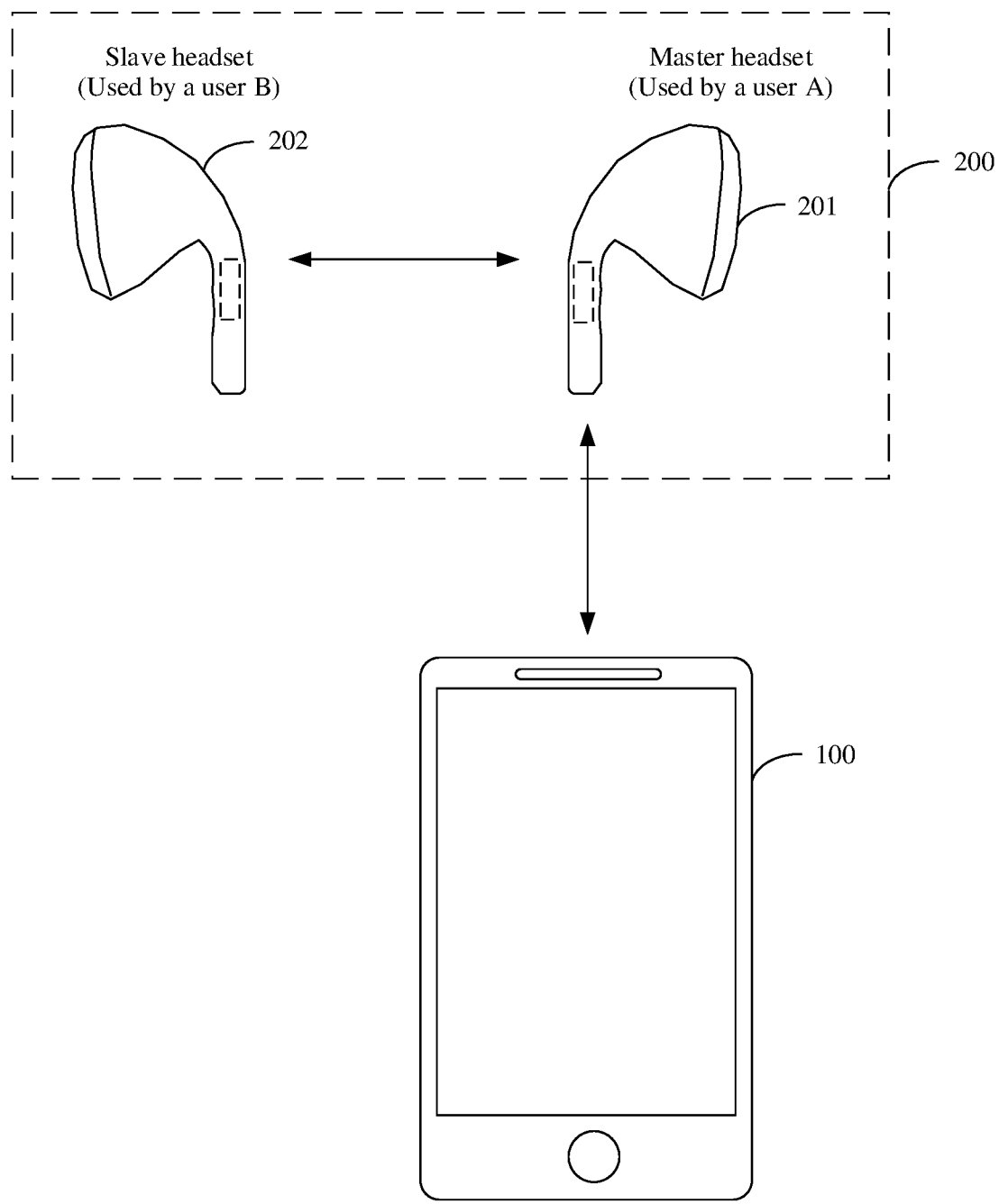
FIG. 3 is a schematic diagram of an application scenario according to an embodiment of this application.

FIG. 3 is a schematic diagram of an application scenario according to an embodiment of this application. A user A and a user B may implement real-time bilingual translation by using an electronic device 100 and a headset 200 connected to the electronic device 100.

In some embodiments, the headset 200 may be, for example, a true wireless stereo (true wireless stereo, TWS) headset. By using a multi-point wireless interconnection technology, a plurality of headsets (for example, left and right headsets) may be designed separately. The plurality of headsets communicate with each other by using a Bluetooth protocol or a private protocol. As shown in FIG. 3, the headset 200 may specifically include a master headset 201 (which may directly communicate with the electronic device 100) and a slave headset 202 (which cannot directly communicate with the electronic device 100, and needs to communicate with the electronic device 100 through the master headset 201, in other words, data exchanged between the slave headset and the electronic device needs to be forwarded through the master headset; and this communication mode is referred to as a forwarding mode). Specifically, the master headset 201 may communicate with the electronic device 100 by using a Bluetooth protocol, and the master headset 201 may communicate with the slave headset 202 by using another Bluetooth protocol, so that the master headset 201 directly communicates with the electronic device 100. In an uplink direction, the slave headset 202 may first transmit a voice or data to the master headset 201, and then the master headset 201 sends the voice or data to the electronic device. In other words, there is only one uplink communication channel between the headset 200 (including the master headset 201 and the slave headset 202) and the electronic device 100, namely, a communication channel between the master headset 201 and the electronic device 100. In a downlink direction, left and right speakers are classified into a master speaker (for example, a TWS Master) and a slave speaker (for example, a TWS Slave). The master speaker is a speaker capable of receiving audio of an advanced audio distribution profile (Advanced Audio Distribution Profile, A2DP) and a streaming media control signal of an audio/video remote control protocol (Audio/Video Remote Control Profile, AVRCP) that are transmitted by electronic devices (audio sources) such as a smartphone and a notebook computer, and transmitting the audio to another TWS device. The slave speaker is a speaker capable of receiving A2DP protocol audio from the master speaker. Alternatively, the two speakers of the TWS headset each may be set to be capable of being used as a master speaker. In this way, audio may be transmitted from the master speaker to the slave speaker, so that the audio can be synchronously played in the two separate speakers.

The master headset 201 and the slave headset 202 each have independent sound pickup and sound playback functions. In this way, the master headset 201 and the slave headset 202 may be respectively used by two users. For example, the user A wears the master headset 201, and the user B wears the slave headset 202. Specifically, when the user A makes a sound, a microphone of the master headset 201 may automatically pick up a voice of the user A, and send the picked-up voice of the user A to the electronic device 100. The electronic device 100 translates the voice of the user A. A translation result may be displayed in a form of a text by using the electronic device 100, or may be played in a form of a voice through the master speaker and/or the slave speaker of the headset 200. When the user B makes a sound, a microphone of the slave headset 202 may automatically pick up a voice of the user B, and send the picked-up voice of the user B to the electronic device 100 through the master headset 201. Then, the electronic device 100 translates the voice of the user B. A translation result may be displayed in the form of a text by using the electronic device 100, or may be played in the form of a voice through the master speaker and/or the slave speaker of the headset 200. For example, after successfully pairing and connecting a pair of TWSs of the user A with a mobile phone of the user A (where the TWSs are in the forwarding mode), the user A enables a translation function, for example, a translation APP, and takes one of the connected headsets to a peer party in a conversation. Then, two parties that speak different languages only need to speak, and automatic sound pickup and translation may be implemented without operating the mobile phone. This simplifies a user operation, greatly facilitates face-to-face translation between the users, and improves communication efficiency.

In this embodiment, there is only one channel for communication between the headset 200 and the electronic device 100. Therefore, when the master headset 201 and the slave headset 202 each pick up a user voice and need to send the user voice to the electronic device 100, the master headset needs to determine a specific headset whose voice is to be sent or whose voice is to be sent first. In other words, the electronic device 100 performs talk right arbitration. Then, the master headset 201 sends, based on a talk right arbitration result, a corresponding voice to the electronic device 100 for translation.

It should be noted that, when the electronic device may be connected to a plurality of headsets, and these headsets include one master headset and a plurality of slave headsets, this embodiment of this application may also be applicable to translation between a plurality of persons. This is not limited in this embodiment of this application.

Figure 4:
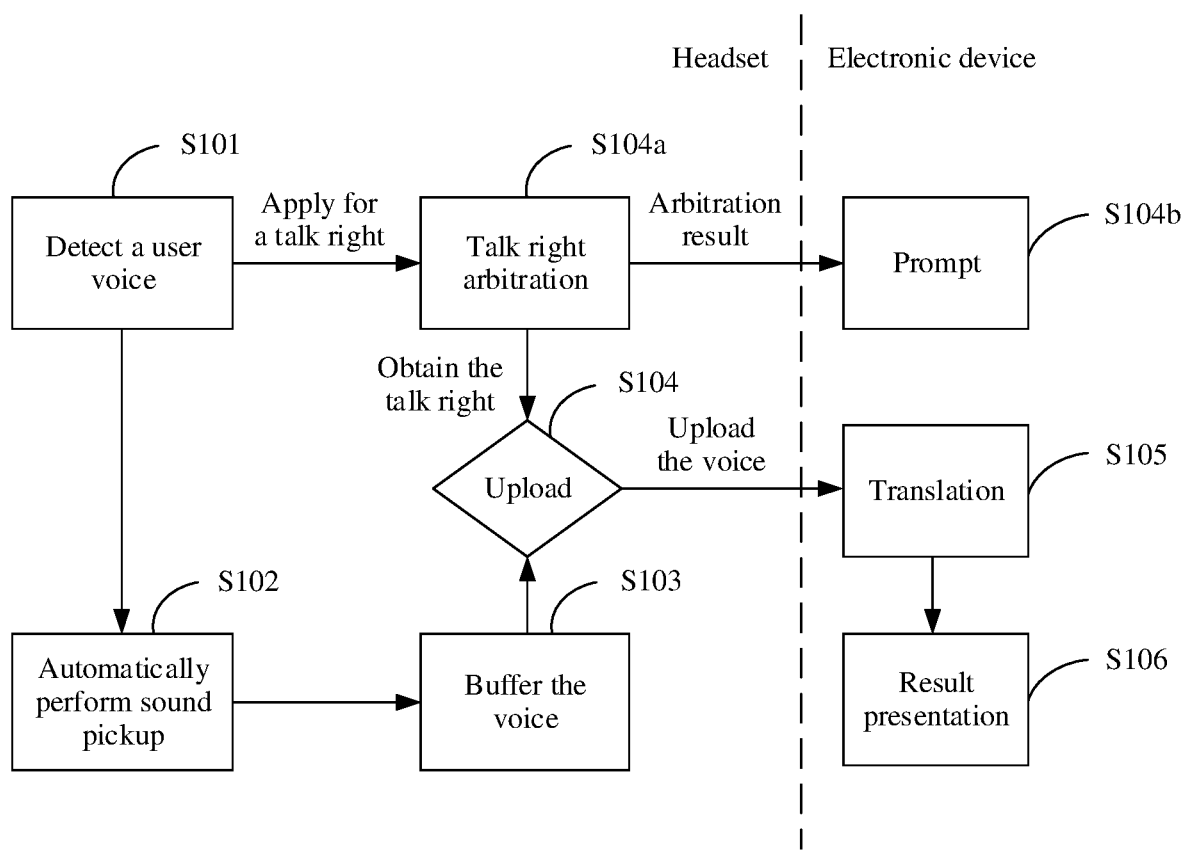
FIG. 4 is a schematic flowchart of a control method according to an embodiment of this application.

FIG. 4 is a schematic flowchart of a translation method according to an embodiment of this application. The translation method specifically includes the following steps.

S101: A headset 1 detects a user voice.

In some embodiments of this application, a bone vibration sensor is disposed in the headset 1. When a user wearing the headset 1 speaks, the bone vibration sensor detects vibration of a bone or vocal cords of the user, and it may be considered that the bone vibration sensor detects a user voice. In this case, the bone vibration sensor may send a trigger signal to a microphone of the headset 1, to indicate the microphone to start sound pickup. In addition, at a moment earlier or later, the bone vibration sensor may also send a signal to apply for a talk right, to subsequently determine whether the headset 1 has the talk right.

S102: The headset 1 automatically performs sound pickup.

For example, after receiving the trigger signal sent by the bone vibration sensor, the headset 1 automatically enables a sound pickup function of the microphone and starts sound pickup.

In some embodiments of this application, before step S101, the headset 1 further needs to detect whether the user wears the headset 1. For example, an optical proximity sensor may be configured for the headset 1, and is configured to detect whether the headset 1 approaches an object, so as to determine whether the user wears the headset 1. For another example, it may be learned with reference to an actual scenario that, in a process in which the user wears the headset 1, a movement status change of the headset 1 follows a specific rule (the user takes out the headset 1, moves the headset 1 to an ear, and rotates the headset 1 back and forth to plug the headset 1 into the ear). In this case, whether the user wears the headset 1 may be determined by detecting the movement status change of the headset 1. Specifically, a motion sensor (any one or more of an acceleration sensor, a gyro sensor, or a distance sensor) may be configured for the headset 1, and is configured to detect the movement status change of the headset 1, so as to determine whether the user wears the headset 1.

Only when the headset 1 detects that the user wears the headset 1, and the user wearing the headset 1 makes a sound, the headset 1 enables the sound pickup function to start sound pickup. In other words, when the user does not wear the headset 1 or the user wearing the headset 1 does not make a sound, the headset 1 does not perform sound pickup. This reduces a case in which an ambient sound is picked up, and improves a sound pickup effect of the headset 1.

S103: The headset 1 buffers a picked-up user voice.

In some embodiments of this application, before step S103, the headset 1 may perform noise reduction processing on the picked-up user voice, to improve the sound pickup effect. In some other embodiments of this application, the headset 1 may also perform noise reduction processing on the buffered user voice, to improve the sound pickup effect. A sequence of user voice buffering and noise reduction processing is not limited in this embodiment of this application.

It should further be noted that this step is an optional step. For the user voice picked up by the headset 1, whether to upload the user voice to an electronic device can be determined only after it is determined whether the headset 1 has the talk right. If after the headset 1 picks up the user voice, the headset 1 can obtain an arbitration result about whether the headset 1 has the talk right, or the headset 1 can obtain the arbitration result about whether the headset 1 has the talk right in a process of picking up the user voice, the headset 1 may not buffer the picked-up user voice. If the headset 1 has the talk right, the picked-up user voice may be directly uploaded to the electronic device, or may be uploaded to the electronic device through a master headset. If the headset 1 does not have the talk right, the picked-up user voice is directly discarded. This is not limited in this embodiment of this application.

S104: The master headset or the electronic device determines whether the headset 1 has the talk right, and if the headset 1 has the talk right, the headset 1 uploads the (buffered) user voice to the electronic device, or the headset 1 uploads the (buffered) user voice to the electronic device through the master headset.

In some embodiments of this application, the headset 1 may be the master headset. In this case, after the master headset detects the user voice, that is, after step S101 is performed, the master headset may start to apply for the talk right. Whether the master headset has the talk right is determined. In other words, talk right arbitration is performed (as shown in step S104*a* in FIG. 4). If the master headset has the talk right, the master headset uploads the (buffered) user voice to the electronic device. If the master headset does not have the talk right, the master headset cannot upload the buffered user voice to the electronic device.

Certainly, the headset 1 may alternatively be a slave headset. In some embodiments, after the slave headset detects the user voice, that is, after step S101 is performed, for example, when or after the slave headset starts sound pickup, the slave headset applies for the talk right from the master headset. The master headset determines whether the slave headset has the talk right. Alternatively, the master headset forwards the talk right application to the electronic device. The electronic device determines whether the slave headset has the talk right, and the master headset forwards a talk right arbitration result delivered by the electronic device to the slave headset. If the talk right arbitration result is that the slave headset has the talk right, the slave headset uploads, through the master headset, the (buffered) user voice to the electronic device for translation. In some other embodiments, after the slave headset detects the user voice, that is, after step S101 is performed, the slave headset may directly upload the picked-up user voice to the master headset, and the master headset buffers the user voice. In addition, the slave headset applies for the talk right from the master headset. The master headset determines whether the slave headset has the talk right. Alternatively, the master headset forwards the talk right application to the electronic device. The electronic device determines whether the slave headset has the talk right, and the master headset forwards the talk right arbitration result delivered by the electronic device to the slave headset. If the talk right arbitration result is that the slave headset has the talk right, the master headset directly uploads the buffered user voice picked up by the slave headset to the electronic device. If the talk right arbitration result is that the slave headset does not have the talk right, the master headset may discard the buffered user voice picked up by the slave headset. This is not limited in this embodiment of this application.

It should be noted that both a step of performing talk right arbitration by the master headset and a step of starting sound pickup by the master headset are after step S101. A sequence between the step of performing talk right arbitration by the master headset and the step of starting sound pickup by the master headset is not limited in this embodiment of this application. To be specific, talk right application may be performed after the sound pickup; or the talk right arbitration may be applied for first, and the sound pickup is enabled only when it is determined that there is the talk right; or sound pickup and talk right application can be performed at the same time.

For example, the talk right arbitration may have the following several cases (arbitration rules):

1. When neither of two users wearing headsets speaks, a user who speaks first has the talk right. It may also be considered that a headset that first detects a voice has the talk right. The electronic device may translate a picked-up voice of the user who speaks first. When the user is speaking, the other user does not have the talk right.

2. If one of the users wearing the headsets speaks and the user has the talk right, the other user does not have the talk right. It may also be considered that a headset uploading a buffered voice to the electronic device for translation has the talk right, and the other headset does not have the talk right.

3. A user having the talk right still has the talk right within a period of time (for example, five seconds) after the user finishes speaking. This is because the user may pause when speaking. If the talk right is switched after a short pause of the user, subsequent words of the user may be affected. Therefore, in this case, the talk right of the user is still reserved. It may also be considered that a headset having the talk right still has the talk right within a period of time in which no user voice is detected.

4. The user having the talk right does not have the talk right after the period of time (for example, five seconds) since the user finishes speaking. It may also be considered that the headset having the talk right no longer has the talk right after the period of time in which no user voice is detected. Then, the other user may be set to have the talk right, or a user who speaks first again may be set to have the talk right. It may also be considered that the other headset may be set to have the talk right, or a headset that first detects the user voice again may be set to have the talk right.

Optionally, after determining whether the headset 1 has the talk right, the master headset may prompt the user of a talk right arbitration result (shown in step S104*b* in FIG. 4). Specifically, in some embodiments, after determining whether the headset 1 has the talk right, the master headset may play a prompt tone through the headset 1, to prompt the user whether the headset 1 has the talk right. For example, a case in which the headset 1 has the talk right and a case in which the headset 1 does not have the talk right may be indicated by playing different prompt tones. For another example, when the headset 1 has the talk right, a prompt tone is played; and when the headset 1 does not have the talk right, no prompt tone is played. Alternatively, when the headset 1 does not have the talk right, a prompt tone is played; and when the headset 1 has the talk right, no prompt tone is played. In some other embodiments, after determining whether the headset 1 has the talk right, the master headset may alternatively display the talk right arbitration result, play different animations, or the like through the electronic device, to prompt the user. A manner of prompting the talk right arbitration result is not limited in this embodiment of this application.

Optionally, the master headset may alternatively prompt the user of the talk right arbitration result through the electronic device (shown in step S104b in FIG. 4). For example, the prompt may be in a form of sound, text, animation, or the like.

S105: The electronic device translates the received user voice.

In some embodiments of this application, the electronic device may set translation languages of the headset 1 and a headset 2 by default. For example, a native language is set for the master headset, for example, Chinese. A foreign language commonly used in the electronic device is set for the slave headset, for example, English. In this case, when the headset 1 is the master headset, the electronic device may automatically translate the voice picked up by the headset 1 into English. When the headset 1 is the slave headset, the electronic device may automatically translate the voice picked up by the headset 1 into Chinese. Optionally, the electronic device may alternatively prompt the user to set a translation language or modify the default translation language before a first translation (the two users start a dialog). Then, during communication between the two users, the translation language does not need to be switched. This is because, through talk right arbitration provided in this embodiment of this application, a user who currently speaks (namely, a user who has the talk right) may be automatically identified, and with reference to the default translation language of the electronic device or the translation language set by the user, a language into which a voice of the user who currently speaks needs to be translated can be automatically determined. Therefore, the user does not need to manually switch the translation language.

In some other embodiments of this application, the electronic device has a translation function, and may convert a to-be-translated user voice into a text, and then translate the text to obtain a translation result. In some other embodiments, the electronic device may convert a to-be-translated user voice into a text, and then upload the text to a cloud server. After translating the text, the cloud server returns a translated text to the electronic device.

S106: The electronic device displays the translation result in a form of a text, or plays the translation result in the form of a voice through the headset 2.

In some embodiments of this application, the electronic device displays the translated text through the display. Alternatively, the electronic device converts the translated text into a voice, and then plays the voice through the headset 2 (or the headset 2 and the headset 1), so that a user wearing the headset 2 can listen to the voice.

It should be noted that, in this application, the electronic device displays the translation result through the display, or plays the translation result through the headset. Compared with the prior art in which a speaker is used to play the translation result, this can ensure privacy of a user dialog, thereby helping enhance user experience.

It can be learned that in the prior art, the user needs to manually enable sound pickup and manually switch the translation language. However, in the technical solution provided in this embodiment of this application, the headset may automatically pick up the user voice, and may automatically determine, through the talk right arbitration, a language into which a voice of a current user (a user having the talk right) is translated. This simplifies a user operation and helps enhance user experience.

Figure 5A:
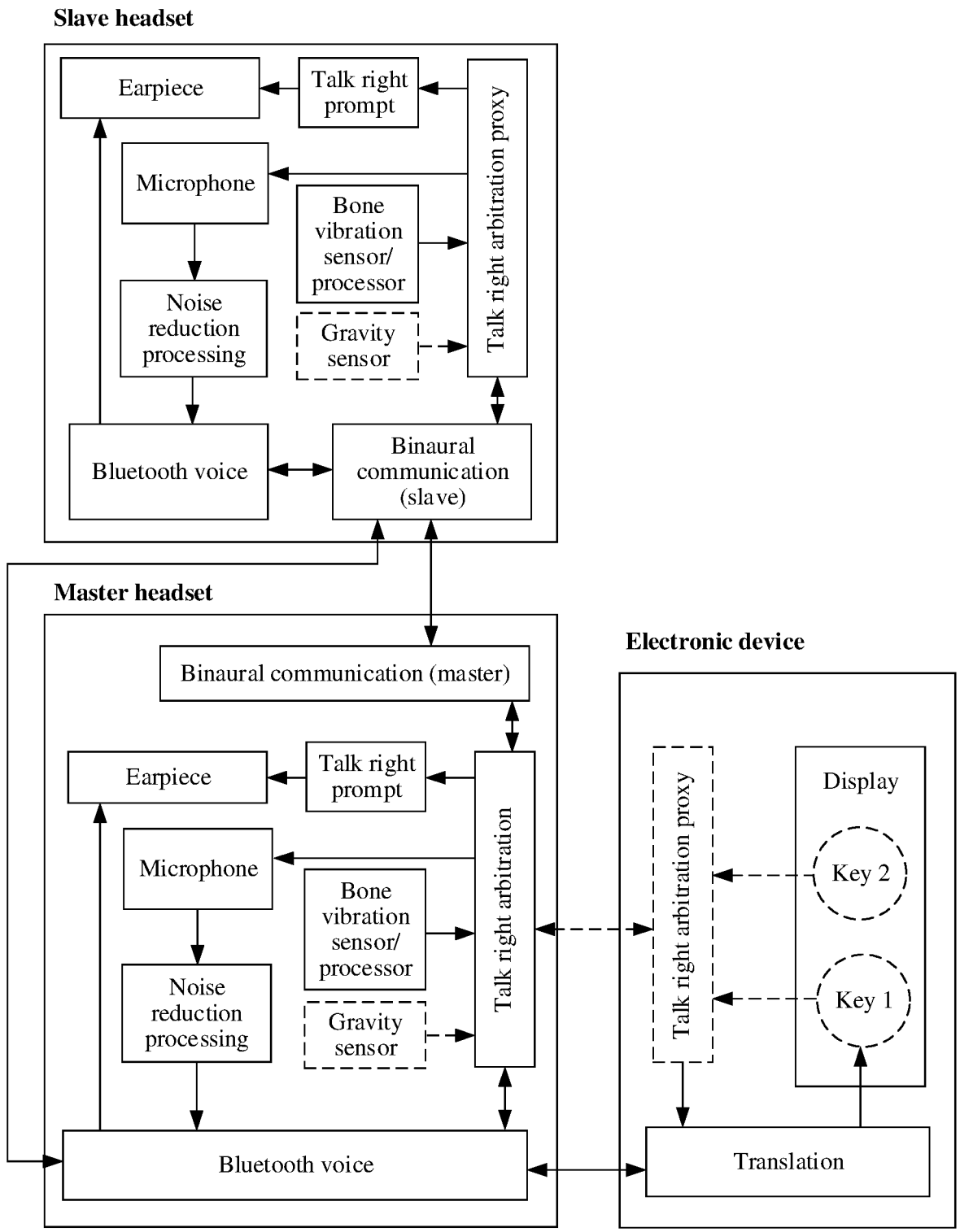
FIG. 5A is a schematic diagram 3 of a structure of an electronic device according to an embodiment of this application.

FIG. 5A is a schematic diagram of a framework diagram of an electronic device connected to a headset according to an embodiment of this application.

For example, a master headset may specifically include a talk right arbitration module, a binaural communication module, a bone vibration sensor, a bone vibration processor, a microphone, a noise reduction processing module, a Bluetooth voice module, an earpiece, and a talk right prompt module. The master headset may further include the talk right prompt module. A structure of a slave headset is similar to that of the master headset, and differences are as follows: 1. The master headset includes the talk right arbitration module, and the slave headset includes a talk right arbitration proxy module. 2. The master headset may directly communicate with the electronic device, and the slave headset communicates with the electronic device through the master headset. 3. The binaural communication module of the slave headset may communicate with the Bluetooth voice module of the master headset. Another difference between the slave headset and the master headset is described in the following process of introducing the translation method. The electronic device may include a translation module, a display (displaying a translation result and a headset that currently has a talk right), and the like. In some other examples of this application, the electronic device may further include a talk right arbitration proxy module, and the display may further include a key 1 and a key 2 (corresponding to the master headset and the right headset respectively). In this way, a user may further manually operate the key 1 or the key 2 on the display, to apply for the talk right from the master headset. For details, refer to a description of an application scenario 5.

The binaural communication module, including the binaural communication (master) module of the master headset and the binaural communication (slave) module of the slave headset, is based on a wireless transmission protocol, for example, Bluetooth, NFC, or Wi-Fi, and provides functions such as status synchronization, data sharing, command control (such as volume control) for the two headsets. The binaural communication module is also a channel for transmitting a talk right application, a talk right arbitration result, and the like between the two headsets.

After the user wears the headset, the bone vibration sensor may detect vibration of a bone when the user speaks, obtain a bone vibration signal corresponding to a voice of the user when the user speaks, and the like.

The bone vibration processor may process the bone vibration signal obtained by the bone vibration sensor, to determine whether the user wearing the headset starts to speak or stops speaking, and output a corresponding signal. The bone vibration processor and the bone vibration sensor may be integrated together. This is not limited in this embodiment of this application.

The noise reduction processing module may optimize a picked-up user voice, to improve a sound pickup effect, so as to improve a translation effect.

The talk right arbitration proxy module is configured to: submit a talk right application to the talk right arbitration module, receive the talk right arbitration result, respond to the talk right arbitration result, and the like.

The talk right arbitration module arbitrates the talk right application to determine whether a talk right applicant has the talk right, and feeds back an arbitration result to the talk right arbitration proxy module, the Bluetooth voice module of the master headset, or the like.

The translation module is configured to provide a basic translation function.

The display of the electronic device is configured to display a user interface (User Interface, UI). For example, the display may display a text of the translation result, and may display the key 1 and the key 2 (which may be used by the user to manually apply for the talk right).

Figure 5B:
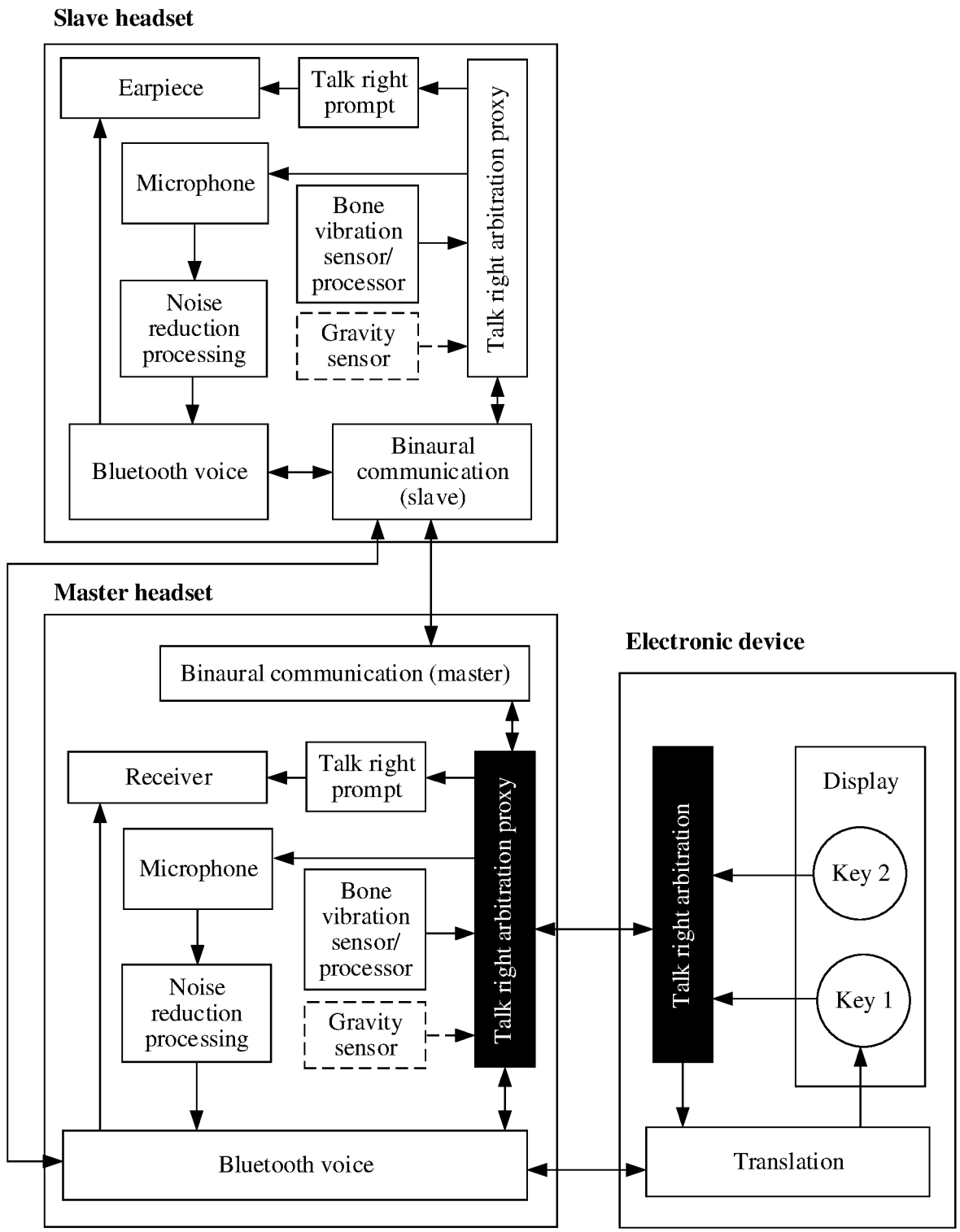
FIG. 5B is a schematic diagram 4 of a structure of an electronic device according to an embodiment of this application.

It should be noted that the foregoing module division and layout are merely examples, and do not constitute a limitation on the electronic device and the headset. For example, the talk right arbitration module in the master headset may alternatively be disposed on the electronic device, and the talk right arbitration proxy module is disposed in the master headset. In other words, in this embodiment of this application, the electronic device may alternatively perform the step of talk right arbitration. As shown in FIG. 5B, the master headset may send a talk right application of the master headset or a received talk right application of the slave headset to the electronic device by using the talk right arbitration proxy module of the master headset, and the talk right arbitration module of the electronic device makes an arbitration. Then, the electronic device sends an arbitration result to the talk right arbitration proxy module of the master headset. If the master headset sends the talk right application, the talk right arbitration proxy module of the master headset determines, based on the arbitration result, whether to upload a (buffered) voice. If the slave headset sends the talk right application, the talk right arbitration proxy module of the master headset sequentially sends the arbitration result to the talk right arbitration proxy module of the slave headset through the binaural communication (master) module of the master headset and the binaural communication (slave) module of the slave headset, so that the slave headset can determine whether to upload a (buffered) voice. For implementation of another part, refer to the description of related content in the foregoing embodiment. Details are not described again. For another example, the master headset may include one or more processors. The one or more processors may implement functions implemented by the foregoing modules such as the bone vibration processor, the noise reduction processing module, and the talk right arbitration module. The slave headset may include one or more processors. The one or more processors may implement functions implemented by the foregoing modules such as the bone vibration processor, the noise reduction processing module, and the talk right arbitration proxy module.

With reference to the framework diagram of the electronic device connected to the headset shown in FIG. 5A, the following describes, by using examples, a plurality of application scenarios of a method in which the headset and the electronic device jointly complete bilingual translation.

Application scenario 1: The slave headset automatically picks up a voice and automatically applies for the talk right.

In some embodiments, after the slave headset detects that a user B wears the slave headset, the bone vibration sensor of the slave headset detects a bone vibration signal, and sends the bone vibration signal to the bone vibration processor. After determining that the user B starts to speak, the bone vibration processor sends a trigger signal to the talk right arbitration proxy module. On one hand, the trigger signal indicates the microphone to enable a sound pickup function, pick up a voice signal of the user B, and submit the picked-up voice signal of the user B to the noise reduction processing module for processing. The processed voice signal of the user B is temporarily stored in the Bluetooth voice module, and waits for a talk right arbitration result. On another hand, the trigger signal indicates the talk right arbitration proxy module to apply for the talk right.

The talk right arbitration proxy module sends the trigger signal to the talk right arbitration module of the master headset through the binaural communication (slave) module of the slave headset and the binaural communication (master) module of the master headset. The talk right arbitration module of the master headset determines, based on the trigger signal and an arbitration rule, whether the user B has the talk right. For the arbitration rule, refer to the related description in step S104. Then, the talk right arbitration module of the master headset transmits the arbitration result to the talk right arbitration proxy module of the slave headset through the binaural communication (master) module of the master headset and the binaural communication (slave) module of the slave headset.

If the arbitration result is that the user B has the talk right, the talk right arbitration proxy module indicates the binaural communication (slave) module to send a user voice buffered in the Bluetooth voice module to the master headset through the binaural communication (slave) module. The master headset uploads the user voice to the translation function of the electronic device through the Bluetooth voice module of the master headset, to complete translation of the voice of the user B. A translation result may be directly displayed on the display of the electronic device, or may be played by the earpiece of the master headset after passing through the Bluetooth voice module of the master headset. In some embodiments, the translation result may alternatively be played by the earpiece of the slave headset after passing through the Bluetooth voice module of the master headset, the binaural communication (slave) module of the slave headset, and the Bluetooth voice module of the slave headset.

If the arbitration result is that the user B does not have the talk right, the talk right arbitration proxy module determines not to upload the voice of the user B buffered in the Bluetooth voice module of the slave headset. In some embodiments, when the slave headset picks up a new voice of the user B, the voice previously stored in the Bluetooth voice module may be overwritten.

Application scenario 2: The sound pickup function of the slave headset is manually enabled, and the slave headset automatically applies for the talk right.

In some embodiments, a gravity sensor may be configured for the slave headset. The gravity sensor may sense vibration exerted by the user B on the slave headset, for example, an operation of double tapping the slave headset by the user B. The operation may be used as a trigger operation of enabling the sound pickup function by the user B. The slave headset starts to pick up a voice of the user B and apply for the talk right. Other content is similar to the method in the application scenario 1, and details are not described again.

Application scenario 3: The master headset automatically picks up a voice and automatically applies for the talk right.

In some embodiments, after the master headset detects that a user A wears the master headset, the bone vibration sensor of the master headset detects a bone vibration signal, and sends the bone vibration signal to the bone vibration processor. After determining that the user A starts to speak, the bone vibration processor sends a trigger signal to the talk right arbitration module. On one hand, the trigger signal indicates the microphone to enable a sound pickup function, pick up a voice signal of the user A, and submit the picked-up voice signal of the user A to the noise reduction processing module for processing. The processed voice signal of the user A is temporarily stored in the Bluetooth voice module, and waits for a talk right arbitration result. On another hand, the trigger signal indicates the talk right arbitration module to apply for the talk right. The talk right arbitration module determines whether the user A has the talk right. For the arbitration rule, refer to the related description in step S104.

If the arbitration result is that the user A has the talk right, the talk right arbitration module indicates the Bluetooth voice module to upload a buffered voice of the user A to the translation function of the electronic device, to complete translation of the voice of the user A. A translation result may be directly displayed on the display of the electronic device, or may be played by the earpiece of the slave headset after passing through the Bluetooth voice module of the master headset, the binaural communication (slave) module of the master headset, and the Bluetooth voice module of the slave headset. In some embodiments, the headset of the master headset may alternatively play the translation result.

If the arbitration result is that the user A does not have the talk right, the talk right arbitration module determines not to upload the buffered voice of the user A. In some embodiments, when the master headset picks up a new voice of the user A, the voice previously stored in the Bluetooth voice module may be overwritten.

Application scenario 4: The sound pickup function of the master headset is manually enabled, and the master headset automatically applies for the talk right.

In some embodiments, a gravity sensor may be configured for the master headset. The gravity sensor may sense vibration exerted by the user A on the master headset, for example, an operation of double tapping the master headset by the user A. The operation may be used as a trigger operation of enabling the sound pickup function by the user A. The master headset starts to pick up a voice of the user A and apply for the talk right. Other content is similar to the method in the application scenario 3, and details are not described again.

Application scenario 5: The user manually applies for a talk right by using the user interface of the electronic device.

In some embodiments, in response to tapping, by the user, the key 1 on the user interface of the electronic device, as shown in FIG. 5A, the electronic device applies, through the talk right arbitration proxy module, for the talk right of the user (for example, the user A) corresponding to the key 1 from the talk right arbitration of the master headset. Alternatively, as shown in FIG. 5B, the talk right arbitration module of the electronic device determines whether the user (or a headset) (for example, the user A) corresponding to the key 1 has the talk right. If the user A has the talk right, the talk right arbitration module of the master headset indicates the Bluetooth voice module of the master headset to upload the buffered voice of the user A to the translation module of the electronic device for translation. For other related content, refer to the description in the application scenario 3.

It is assumed that in response to tapping, by the user, the key 2 on the user interface of the electronic device, the electronic device applies, through the talk right arbitration proxy module, for the talk right of the user (for example, the user B) corresponding to the key 2 from the talk right arbitration of the master headset. If the user B has the talk right, the talk right arbitration module of the master headset indicates, through the binaural communication (master) module of the master headset, the binaural communication (slave) module of the slave headset, and the talk right arbitration proxy module of the slave headset, the Bluetooth voice module of the slave headset to upload the buffered voice of the user B to the translation module of the electronic device for translation. For other related content, refer to the description in the application scenario 1.

FIG. 6(a) to FIG. 6(f) are schematic diagrams of some user interfaces of an electronic device according to an embodiment of this application. The following describes the translation method provided in the embodiments of this application with reference to the interface diagrams in FIG. 6(a) to FIG. 6(f).

Figure 6A:
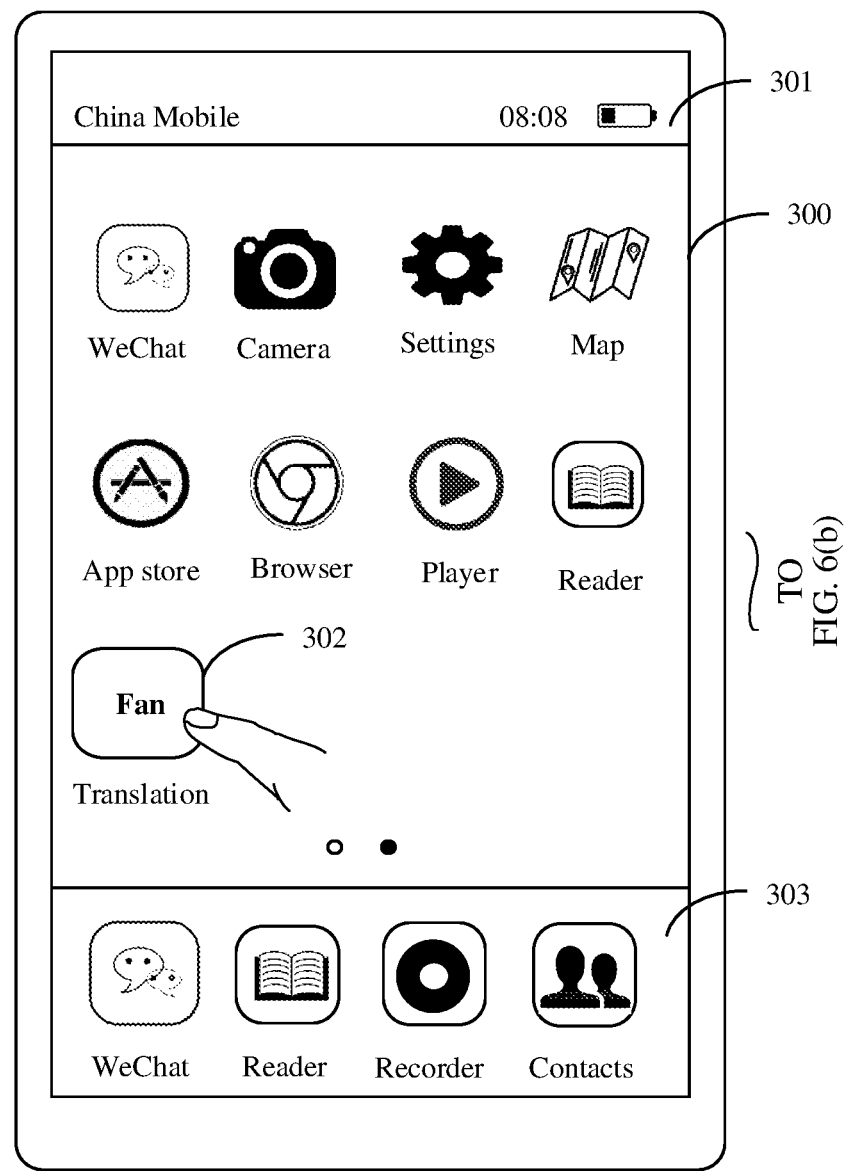
FIG. 6(a) to FIG. 6(f) are schematic diagrams of some interfaces of an electronic device according to an embodiment of this application.

FIG. 6(a) is a schematic diagram of an interface 300 of the electronic device according to an embodiment of this application. The interface 300 may include a status bar 301, icons of a plurality of applications (for example, an icon 302 of a translation application), and a dock (dock) bar 303. The status bar 301 may include information such as operator information, time, a battery level, and a network connection. The dock bar 303 may include icons of a plurality of commonly used applications, for example, a "WeChat" icon, a "Reading" icon, a "Recorder" icon, and a "Contacts" icon. The translation application is a translation application provided in the embodiments of this application, and can implement a bilingual translation function. For a specific implementation, refer to the foregoing descriptions.

Figure 6B:
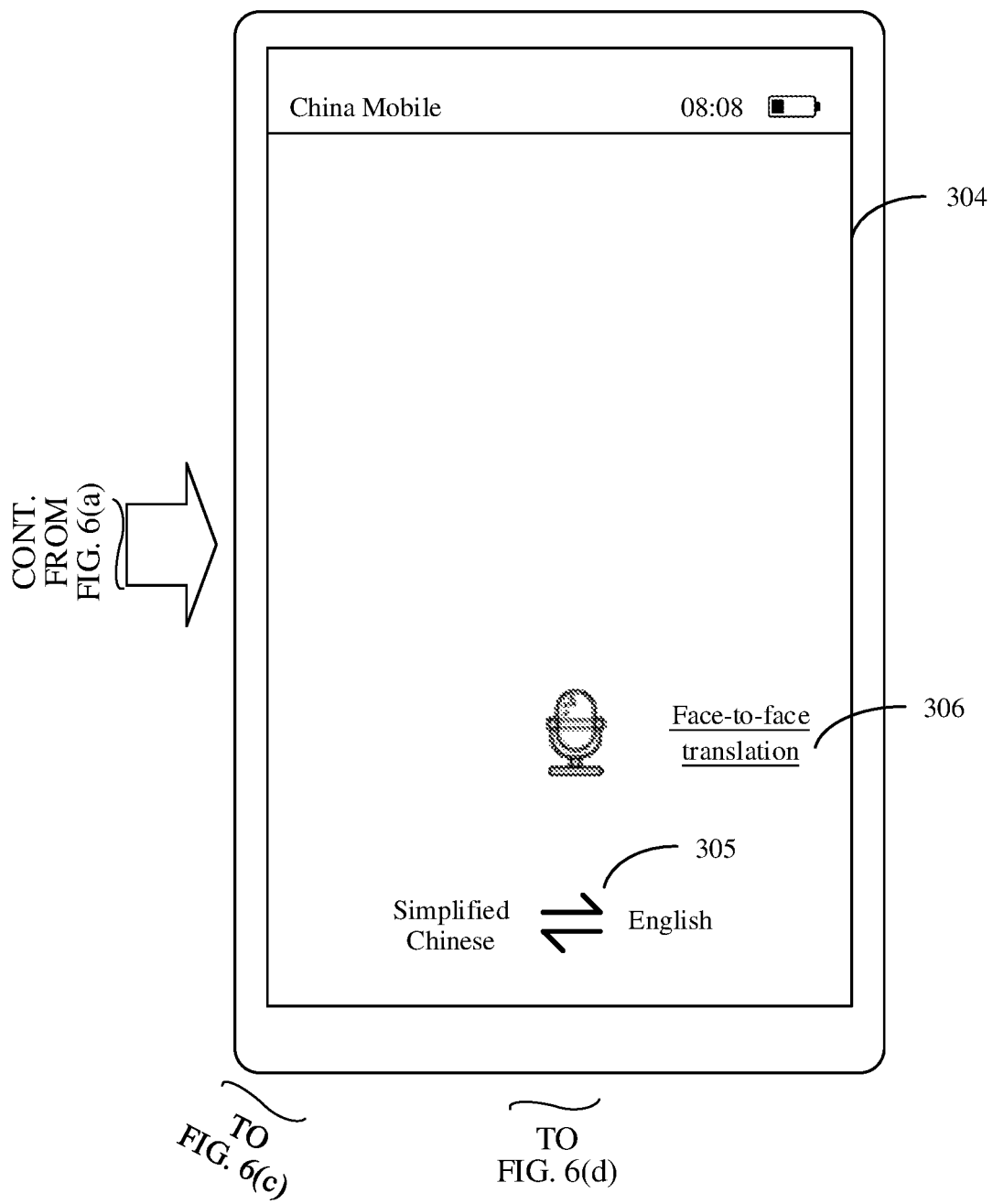
Figure 6C:
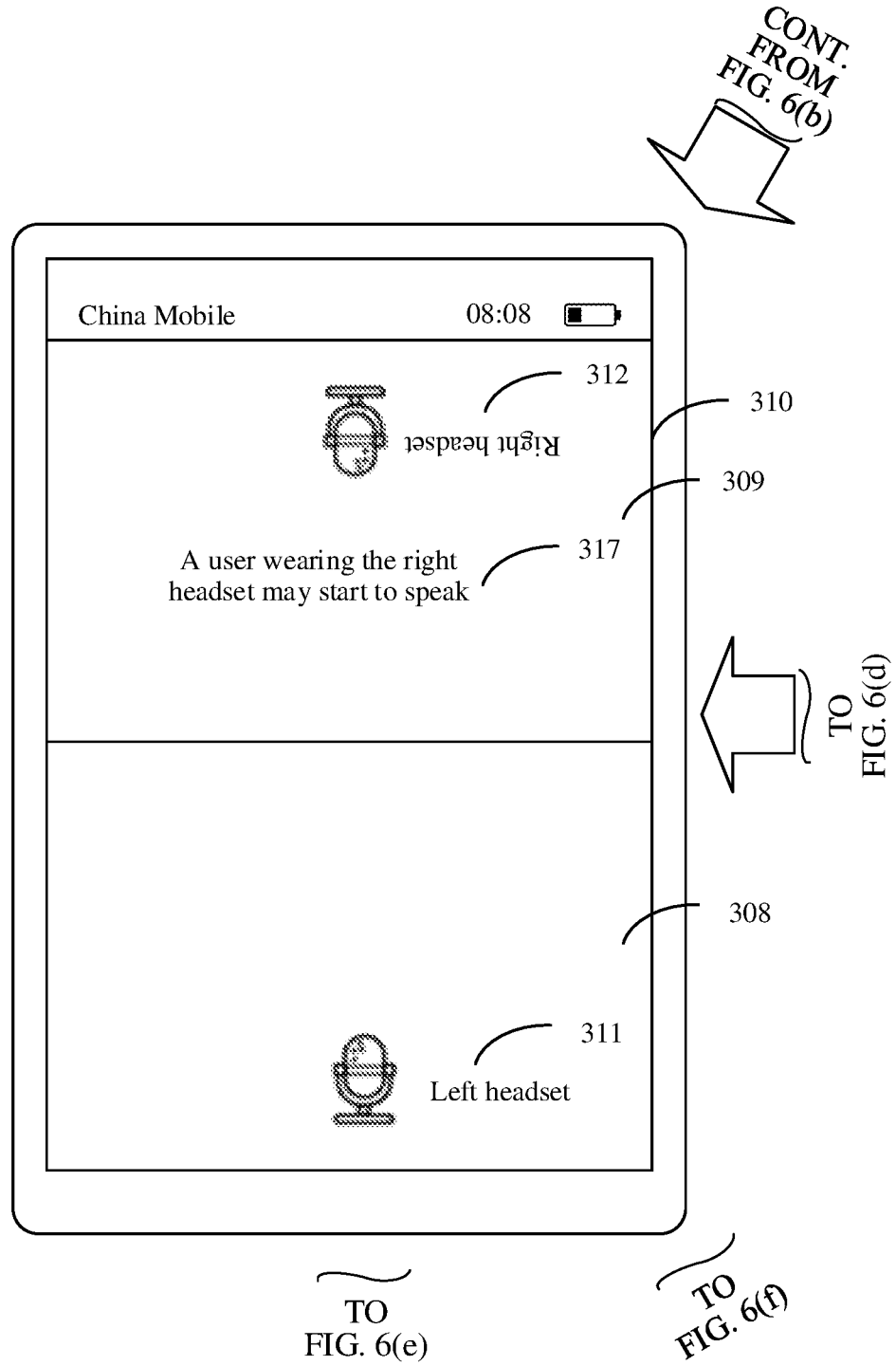

In response to a detected operation of tapping the icon 302 of the translation application by a user, the electronic device displays a home application interface 304 of the translation application shown in FIG. 6(b). The home application interface 304 may include a translation language option 305 and a face-to-face translation option 306. For example, the electronic device may be set by default as translation between a native language and a commonly used foreign language, for example, translation between Chinese and English. Alternatively, the user may modify a setting through the translation language option 305. Optionally, the translation language option 305 may also be set on another interface, for example, on an interface 307 or an interface 310 obtained after face-to-face translation is enabled. This is not limited in this embodiment of this application.

Figure 6D:
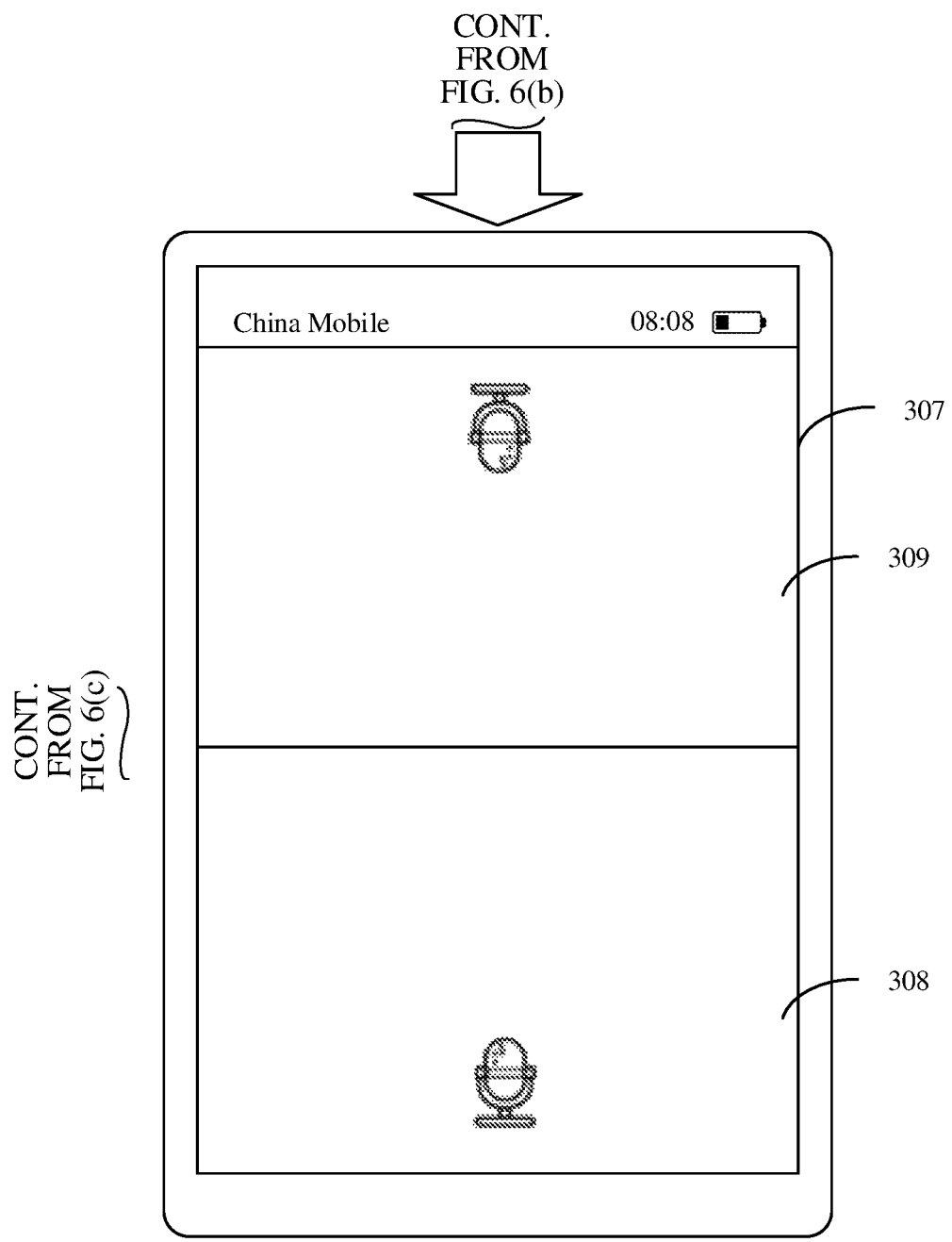
Figure 6E:
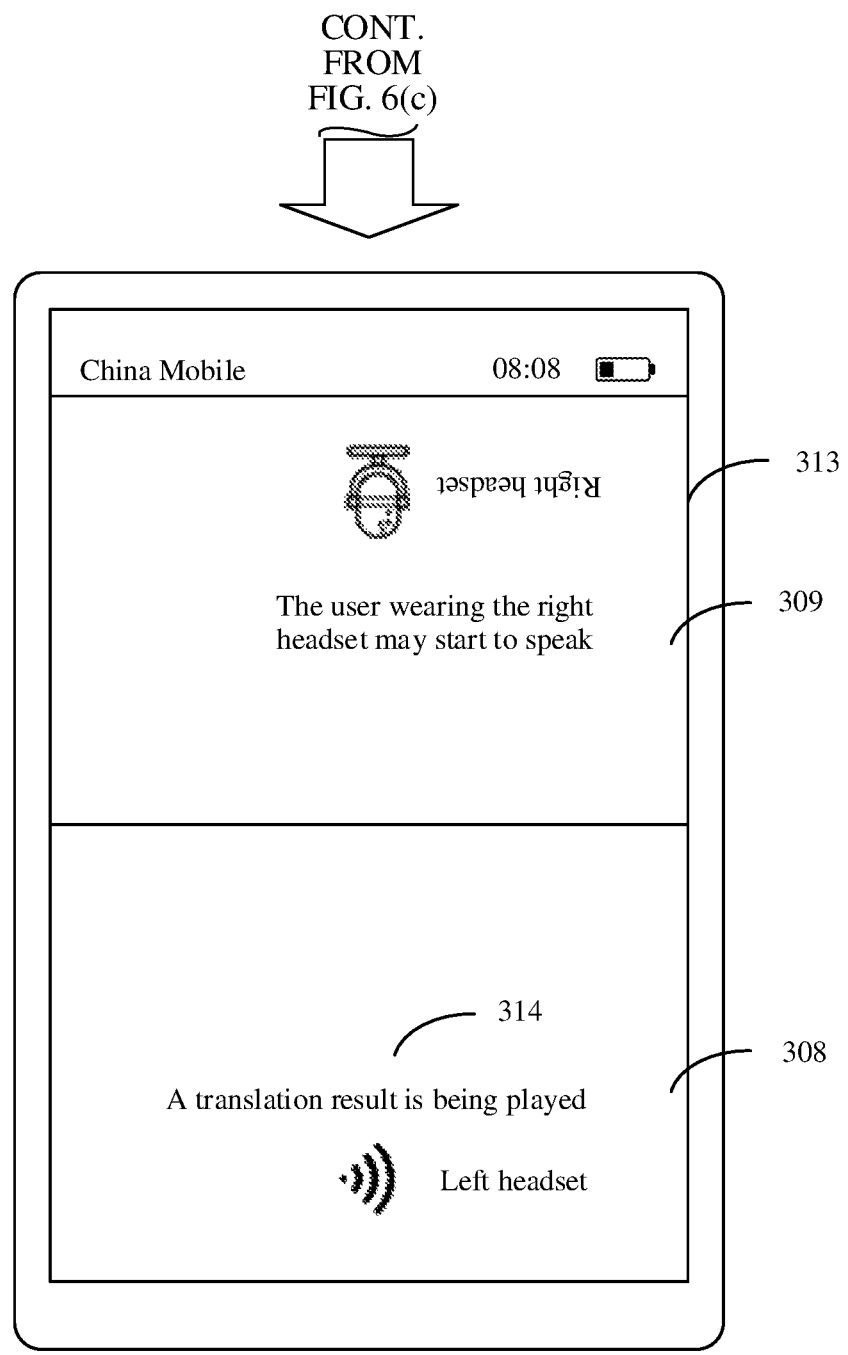
Figure 6F:
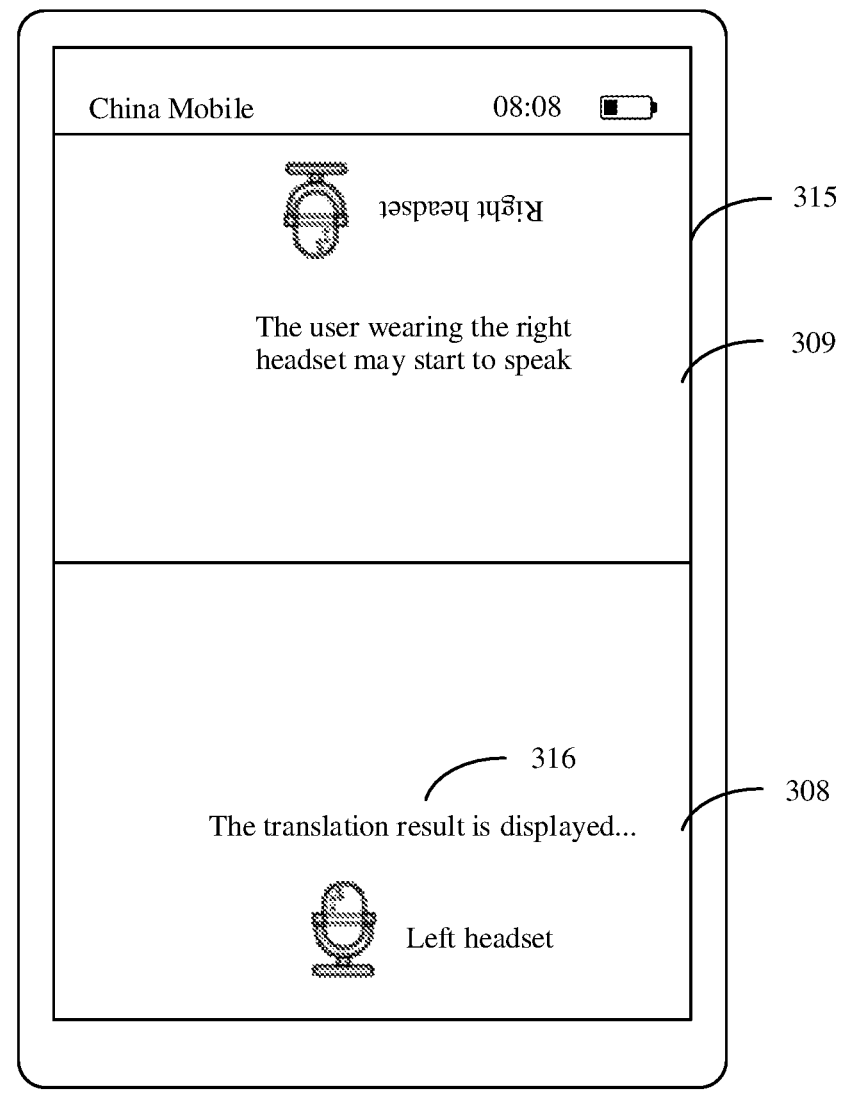
Figure 7A:
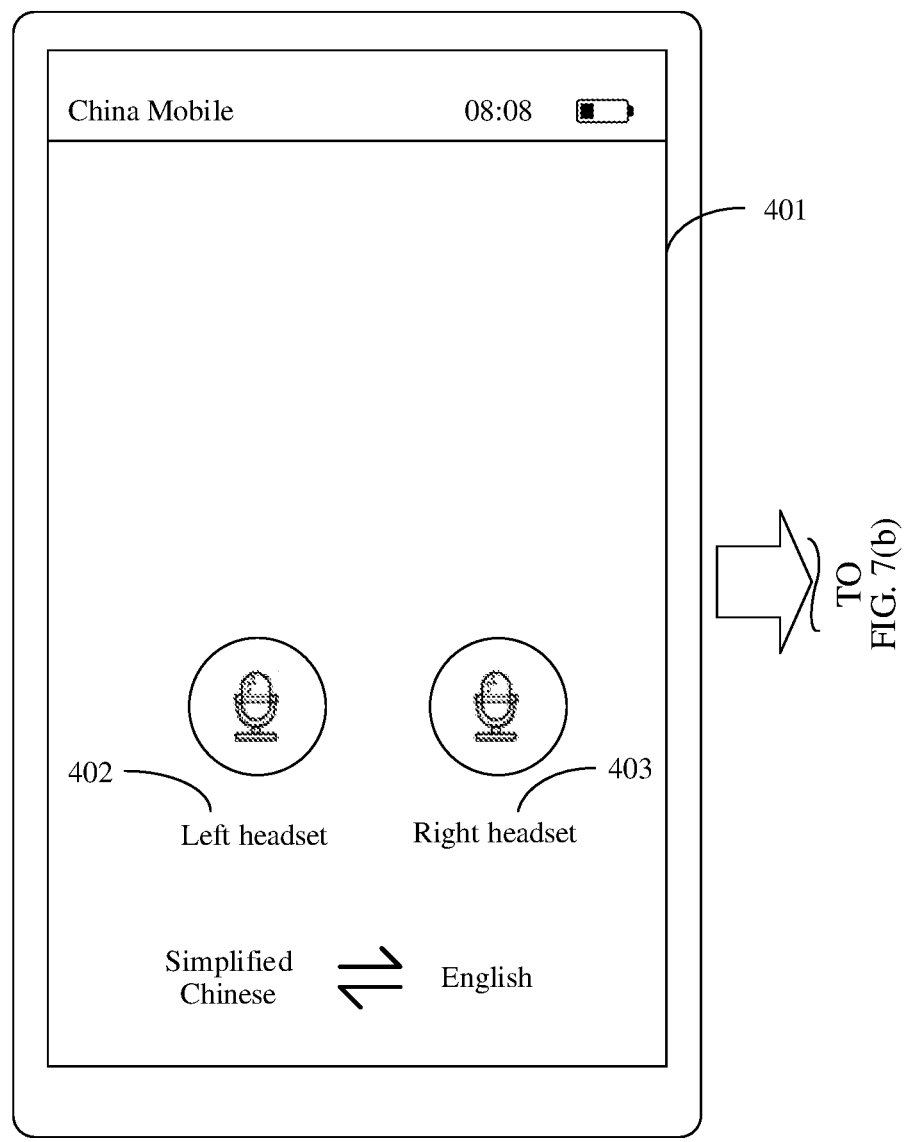
FIG. 7(a) to FIG. 7(f) are schematic diagrams of some other interfaces of an electronic device according to an embodiment of this application.
Figure 7B:
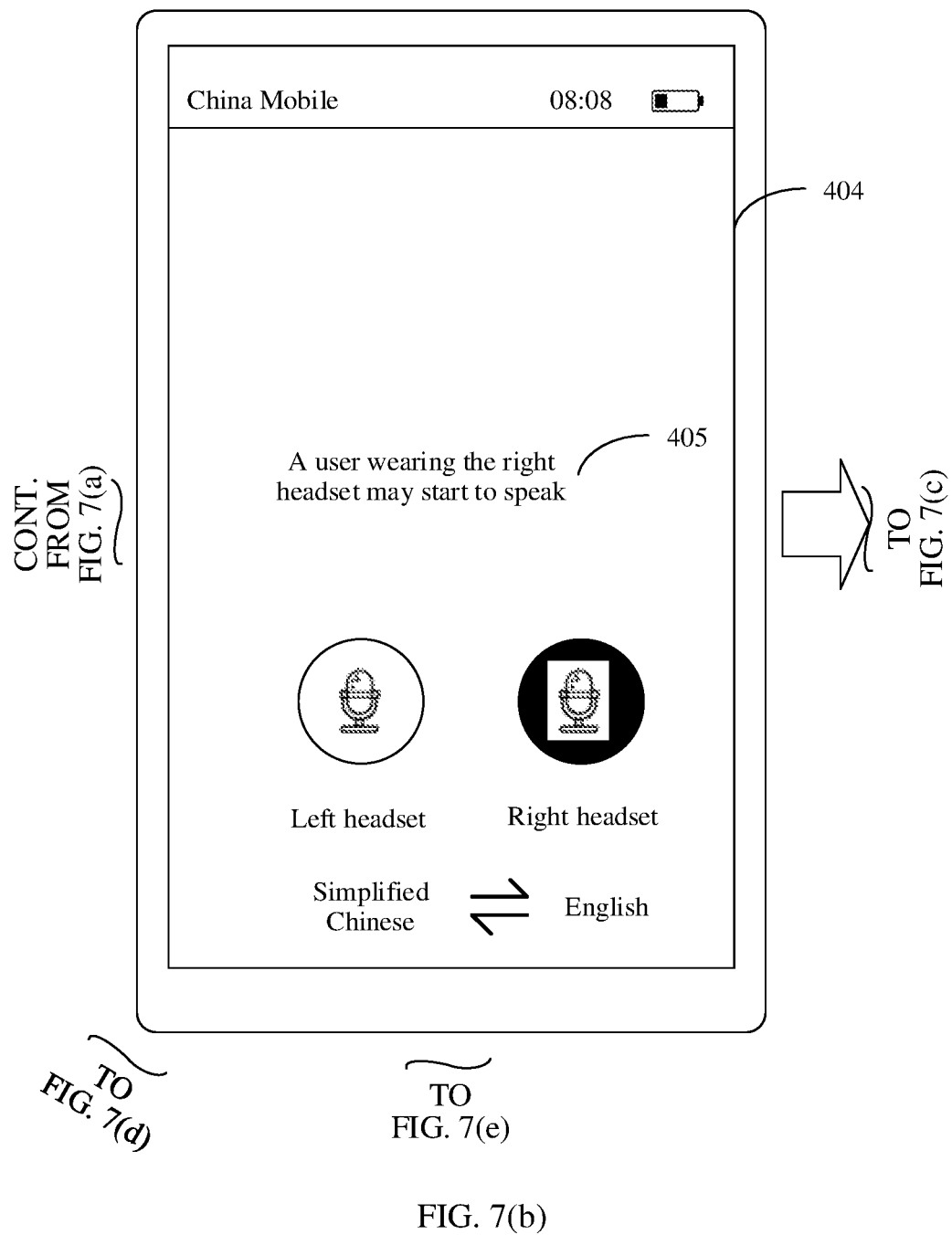
Figure 7C:
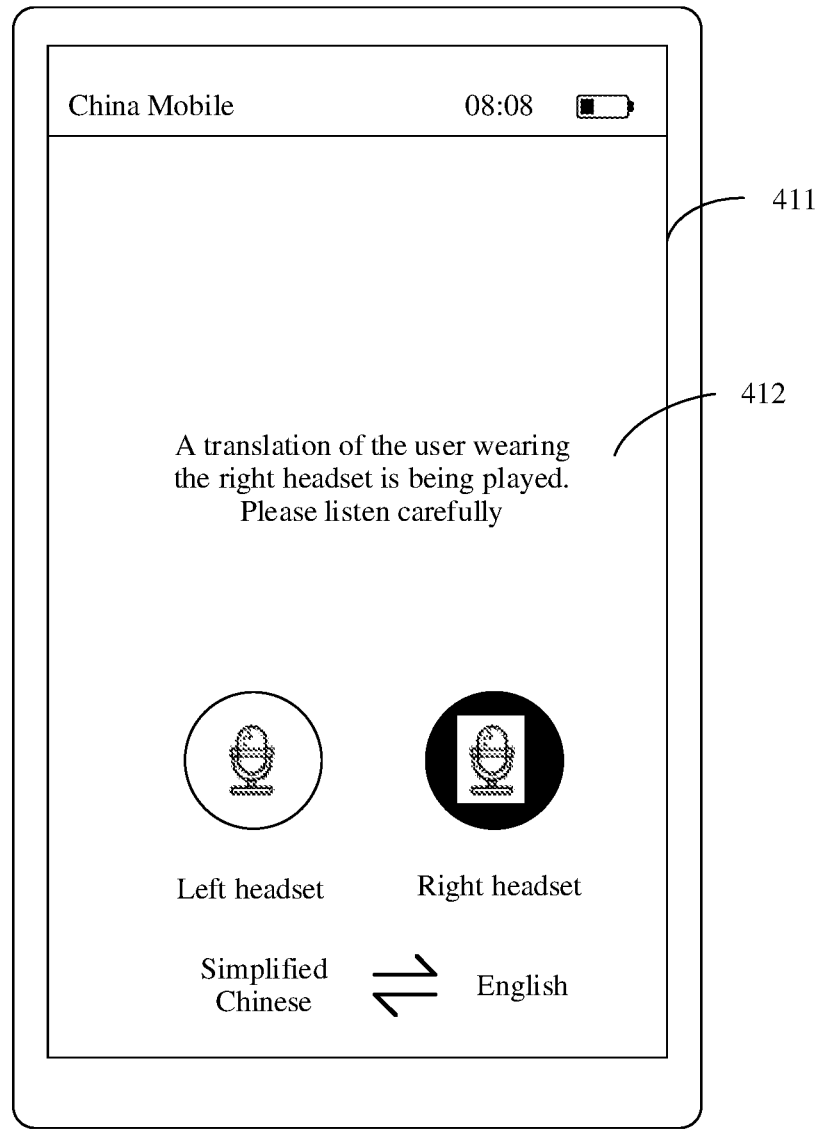
Figure 7D:
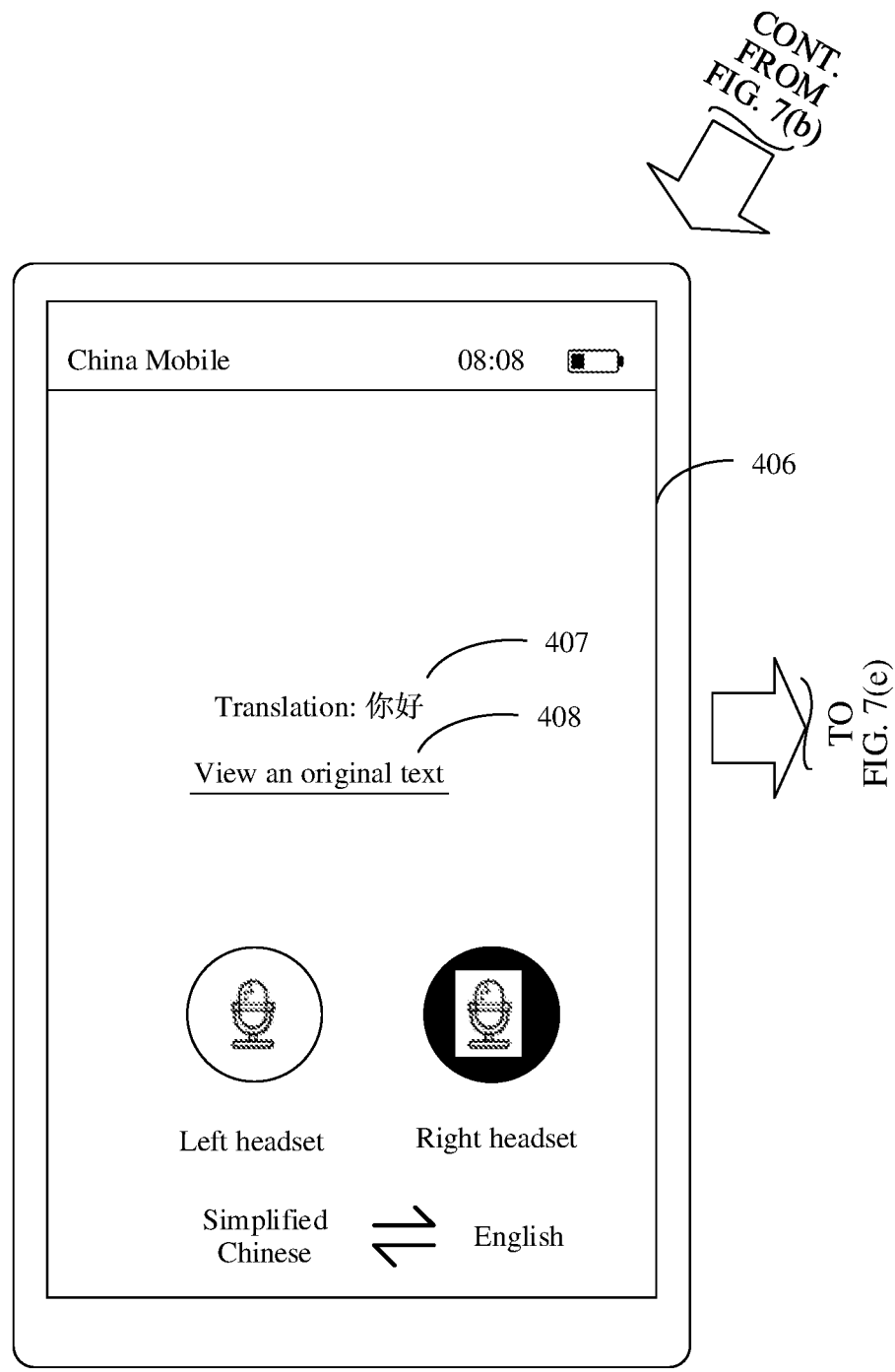
Figure 7E:
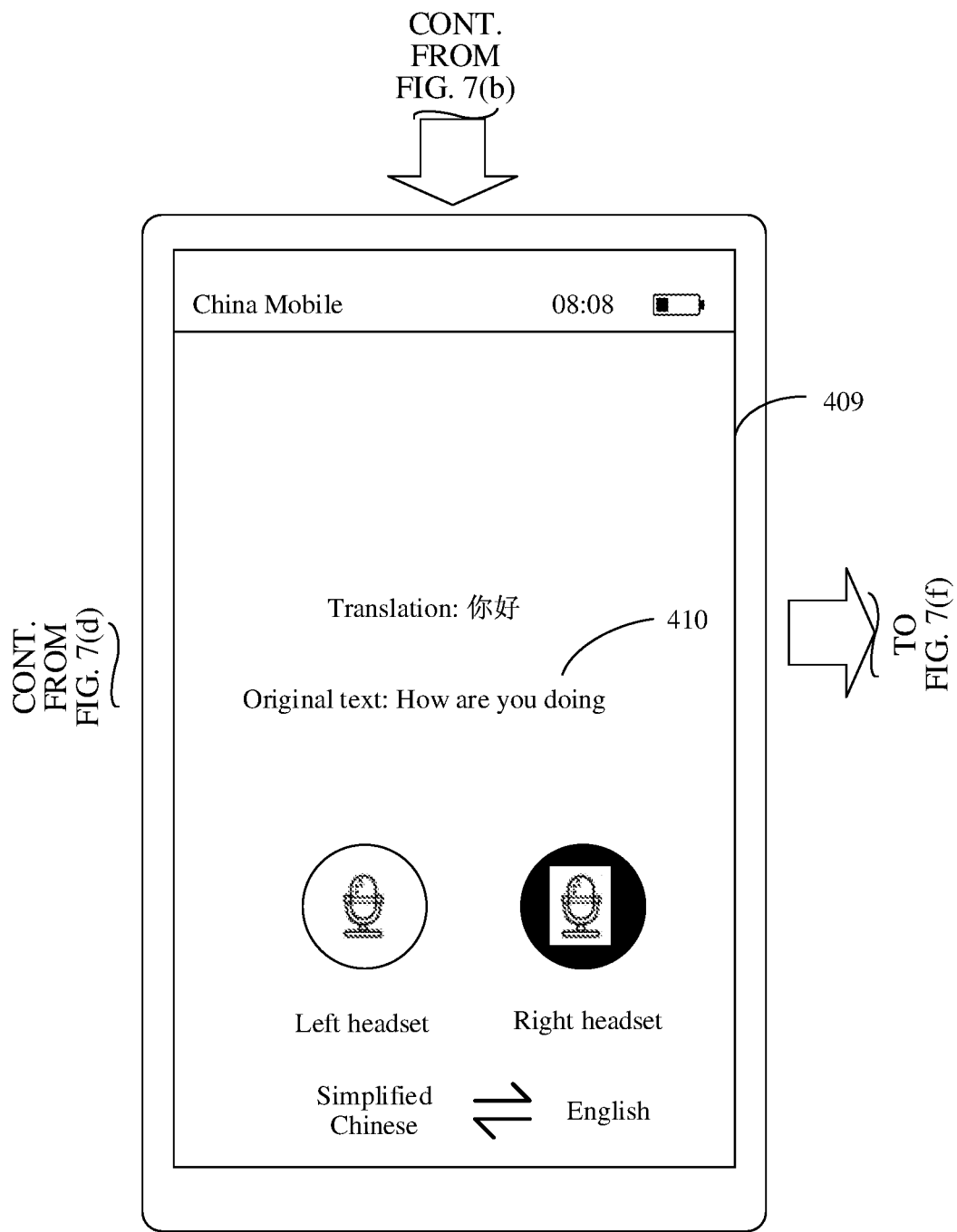
Figure 7F:
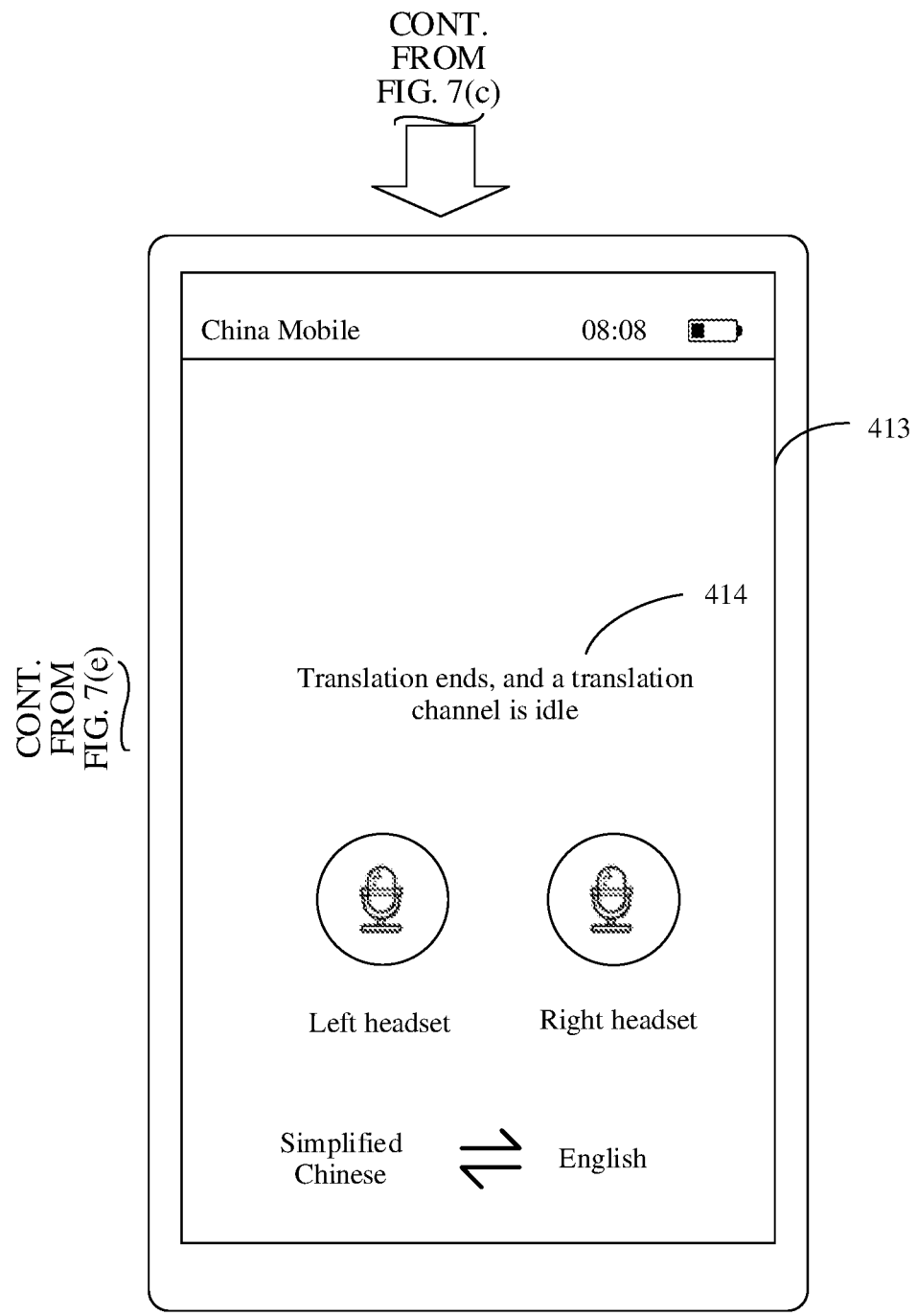

In response to detecting that the user taps the face-to-face translation option 306, the electronic device displays the interface 307 shown in FIG. 6(d). On the interface 307, the electronic device is divided into two areas, and each area corresponds to one user. For example, an area 308 corresponds to a user A, and an area 309 corresponds to a user B. After the electronic device detects that the user A and the user B each wear a headset, the electronic device may display the interface 310 shown in FIG. 6(c). A headset identifier corresponding to each area may be displayed on the interface 310. For example, an identifier 311 of a "left headset" is displayed in the area 308, and an identifier 312 of a "right headset" is displayed in the area 309. The interface 310 may further display prompt information of a headset currently having a talk right. For example, prompt information 317 is displayed in the area 309, indicating that the right headset (the user B wears the right headset) has the talk right at this time, and the user B may start to speak. Both prompt content and a prompt manner are not limited in this embodiment of this application.

It should be noted that, the electronic device may identify two headsets by using the identifier of the left headset and the identifier of the right headset, or may identify the two headsets by using an identifier of a master headset and an identifier of a slave headset. In addition, the identifier may be in a form of a character, a letter, a number, or the like, or in a form of an icon or a graph. A specific form of the identifier is not limited.

In some embodiments, the area 308 and the area 309 each may further include a control for applying for the talk right. The control may be configured to receive an operation of manually applying for the talk right by the user, for example, tapping or pressing and holding. For example, after the electronic device detects an operation performed by the user on the control for applying for the talk right in the area 308, the operation may be used to apply for the talk right of the headset (for example, the left headset) corresponding to the area 308. For another example, after the electronic device detects an operation performed by the user on the control for applying for the talk right in the area 309, the operation may be used to apply for the talk right of the headset (for example, the left headset) corresponding to the area 309. Specifically, the electronic device may perform talk right arbitration, or the electronic device sends the talk right application to the master headset, and the master headset performs talk right arbitration. For a specific implementation, refer to the foregoing related descriptions.

After detecting that the user B starts to speak, the electronic device automatically starts sound pickup and applies for the talk right. When determining that the user B has the talk right, the electronic device uploads a voice of the user B, and translates the voice of the user B. For a specific implementation process, refer to the foregoing descriptions. Details are not described herein again.

After translating the voice of the user B, the electronic device plays a translation result in a form of a voice. Alternatively, the electronic device may translate the voice of the user B while playing a translation result in the form of a voice. In these two cases, an interface 313 shown in FIG. 6(*e*) is displayed. Alternatively, the electronic device displays the translation result in a form of a text. For example, an interface 315 shown in FIG. 6(*f*) is displayed. For example, on the interface 313, because the user B has the talk right and the voice of the user B is translated, prompt information 314 is displayed in the area 308 corresponding to the user A, to prompt the user A that the translation result is played. For another example, on the interface 315, because the user B has the talk right, and the voice of the user B is translated, a translation result 316 is displayed in the area 308 corresponding to the user A.

It should further be noted that when displaying the translation result 316, the electronic device may further display a text in an original language corresponding to the translation result 316.

In some embodiments, the user has worn the headset before tapping the face-to-face translation option 306 on the interface 304 shown in FIG. 6(*b*). In this case, in response to detecting that the user taps the face-to-face translation option 306, the electronic device displays the interface 310 shown in FIG. 6(*c*).

FIG. 7(*a*) to FIG. 7(*f*) are schematic diagrams of some other user interfaces of the electronic device according to an embodiment of this application. The following describes the translation method provided in the embodiments of this application with reference to the interface diagrams in FIG. 7(*a*) to FIG. 7(*f*).

After detecting that the user taps the face-to-face translation option 306 on the interface 304 shown in FIG. 6(*b*), the electronic device may display an interface 401 shown in FIG. 7(*a*). The interface 401 displays an identifier 402 of the left headset and an identifier 403 of the right headset.

On an interface 404 shown in FIG. 7(*b*), after determining a headset having the talk right, the electronic device may further prompt the user of the headset that currently has the talk right. For example, prompt information 405 of the talk right may be displayed on the interface 404, and is used to indicate the headset (or a user corresponding to the headset) that currently has the talk right and that is determined by the electronic device or the master headset. Optionally, the user may alternatively be prompted separately or simultaneously by using a change of an identifier or an icon of the headset. For example, the user is prompted by using a dynamic change, a color change, a brightness change, or the like of the icon corresponding to the headset having the talk right. A prompt manner is not limited in this embodiment of this application.

After receiving a user voice picked up by the right headset, the electronic device translates the user voice, and a result obtained after the translation may be played to the user in a form of a sound. For example, on an interface 411 shown in FIG. 7(*c*), prompt information 412 may be displayed on the interface 411, to prompt the user that the translation result is played. Optionally, the electronic device may alternatively display the translation result, namely, a translation, on the display interface. For example, the electronic device may display only the translation, and does not display an original text; or may display the translation and the original text simultaneously; or switches between displaying the translation and displaying the original text based on a switching operation of the user. For example, on an interface 406 shown in FIG. 7(*d*), a translation 407 may be displayed on the interface, and an option 408 for viewing an original text may further be displayed. The user may tap the option 408 for viewing an original text, to enter an interface 409 shown in FIG. 7(*e*). An original text 410 is displayed on the interface 409.

On an interface 413 shown in FIG. 7(*f*), after the electronic device translates a voice of the user currently having the talk right, and the electronic device or the master headset releases the talk right of the user, the electronic device may further display prompt information 414 to prompt the user that a current translation channel is idle. In this case, any user can speak, a user who speaks first can obtain the talk right, and a user who speaks later does not have the talk right.

It may be understood that to implement the foregoing functions, the terminal includes corresponding hardware and/or software modules for performing the functions. With reference to algorithm steps of each example described in the embodiments disclosed in this specification, this application may be implemented in a form of hardware or a combination of hardware and computer software. Whether a function is performed by hardware or hardware driven by computer software depends on a particular application and a design constraint of the technical solutions. A person skilled in the art may use different methods to implement the described functions for each particular application with reference to the embodiments, but it should not be considered that the implementation goes beyond the scope of this application.

In the embodiments of this application, the terminal may be divided into function modules based on the foregoing method examples. For example, function modules corresponding to the functions may be obtained through division, or two or more functions may be integrated into one processing module. The integrated module may be implemented in a form of hardware. It should be noted that, in the embodiments of this application, division into the modules is an example, and is merely logical function division. In an actual implementation, another division manner may be used.

An embodiment of this application further provides a computer storage medium. The computer storage medium stores a computer instruction. When the computer instruction is run on a terminal, the terminal is enabled to perform the foregoing related method steps to implement the translation methods in the foregoing embodiments.

An embodiment of this application further provides a computer program product. When the computer program product runs on a computer, the computer is enabled to perform the foregoing related steps, to implement the translation methods in the foregoing embodiments.

In addition, an embodiment of this application further provides an apparatus. The apparatus may be specifically a chip, a component, or a module. The apparatus may include a processor and a memory that are connected to each other. The memory is configured to store a computer executable instruction. When the apparatus runs, the processor may execute the computer executable instruction stored in the memory, to enable the chip to perform the translation methods in the foregoing method embodiments.

The headset, the electronic device, the computer storage medium, the computer program product, or the chip provided in the embodiments of this application may be configured to perform the corresponding method provided above. Therefore, for beneficial effects that can be achieved, refer to the beneficial effects of the corresponding method provided above. Details are not described herein again.

The foregoing descriptions about implementations allow a person skilled in the art to understand that clearly, for convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in another manner. For example, the described apparatus embodiments are merely examples. For example, division into modules or units is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may be one or more physical units, may be located in one place, or may be distributed in different places. Some or all of the units may be selected based on an actual requirement to achieve an objective of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software function unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes: any medium that can store program code, such as a USB flash drive, a removable hard disk, a read-only memory (read only memory, ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
   detecting, by a master headset, a first voice, wherein the master headset and a slave headset are connected to an electronic device, the master headset directly communicates with the electronic device, and the slave headset communicates with the electronic device through the master headset;
   automatically picking up, by the master headset, the first voice in response to detecting the first voice;
   determining, by the master headset or the electronic device, whether the master headset has a talk right comprising:
      after a preset time period in which neither the master headset nor the slave headset detects a user voice, when the master headset first detects the user voice, determining that the master headset has the talk right, and the slave headset does not have the talk right, or
      after the preset time period in which neither the master headset nor the slave headset detects the user voice, when the slave headset first detects the user voice, determining that the slave headset has the talk right, and the master headset does not have the talk right, or
      when the master headset has the talk right, determining that the master headset has the talk right within the preset time period in which the master headset does not detect the user voice, and determining that the master headset does not have the talk right after the preset time period in which the master headset does not detect the user voice;
   in response to the master headset determining that the master headset has the talk right, uploading, by the master headset, the first voice to the electronic device; and
   receiving, by the slave headset, a first translation result through the master headset, and playing the first translation result, wherein the first translation result is a result obtained by the electronic device by automatically translating the first voice according to a setting for mutual translation between languages.

2. The method according to claim 1, further comprising:
   requesting, by the master headset, the talk right from the electronic device; and
   receiving, by the master headset, a result, returned by the electronic device, of determining whether the master headset has the talk right.

3. The method according to claim 1, further comprising:
   detecting, by the slave headset, a second voice;

automatically picking up, by the slave headset, the second voice in response to detecting the second voice;

requesting, by the slave headset, the talk right from the master headset; and when the slave headset receives, from the master headset, a determining result that the slave headset has the talk right, uploading, by the slave headset, the second voice to the electronic device through the master headset, causing the electronic device to automatically translate the second voice according to the setting for mutual translation between languages, and send, to the master headset for playing, a translation result obtained by translating the second voice.

4. The method according to claim 3, wherein the slave headset receiving, from the master headset, the determining result that the slave headset has the talk right comprises:

sending, by the master headset, the determining result to the slave headset when the master headset determines that the slave headset has the talk right; or performing the following:
requesting, by the master headset, the talk right of the slave headset from the electronic device;
receiving, by the master headset, the determining result that the electronic device determines that the slave headset has the talk right; and
sending, by the master headset, the determining result to the slave headset.

5. The method according to claim 3, further comprising determining, by the master headset or the electronic device, based on the following factors, whether the slave headset has the talk right:

after the preset time period in which neither the master headset nor the slave headset detects the user voice, when the master headset first detects the user voice, determining that the master headset has the talk right, and the slave headset does not have the talk right; or after the preset time period in which neither the master headset nor the slave headset detects the user voice, when the slave headset first detects the user voice, determining that the slave headset has the talk right, and the master headset does not have the talk right; or when the slave headset has the talk right, determining that the slave headset has the talk right within the preset time period in which the slave headset does not detect the user voice, and determining that the slave headset does not have the talk right after the preset time period in which the slave headset does not detect the user voice.

6. The method of claim 1, further comprising displaying, by the electronic device, a first interface, wherein the first interface displays a first control and a second control, the first control corresponds to the master headset, and the second control corresponds to the slave headset.

7. The method of claim 6, further comprising prompting a user of the electronic device according to the following:

in response to the electronic device determining that the master headset has the talk right, displaying, by the electronic device, first prompt information on the first interface, to prompt the user that the master headset has the talk right; or in response to the electronic device determining that the slave headset has the talk right, displaying, by the electronic device, second prompt information on the first interface, to prompt the user that the slave headset has the talk right; or in response to that the electronic device determining that neither the master headset nor the slave headset has the talk right, displaying, by the electronic device, third prompt information on the first interface, to prompt the user that neither the master headset nor the slave headset has the talk right.

8. The method of claim 7, further comprising:

after displaying the first prompt information on the first interface, further displaying, by the electronic device, the first translation result; or after displaying the second prompt information on the first interface, further displaying, by the electronic device, a second translation result, wherein the second translation result is a translation result obtained by the electronic device by automatically translating a user voice picked up by the slave headset.

9. A method, comprising:

detecting, by a master headset, a first voice, wherein the master headset and a slave headset are connected to an electronic device, the master headset directly communicates with the electronic device, and the slave headset communicates with the electronic device through the master headset;

automatically picking up, by the master headset, the first voice in response to detecting the first voice;

determining, by the master headset or the electronic device, whether the slave headset has a talk right comprising:

after a preset time period in which neither the master headset nor the slave headset detects a user voice, when the master headset first detects the user voice, determining that the master headset has the talk right, and the slave headset does not have the talk right, or after the preset time period in which neither the master headset nor the slave headset detects the user voice, when the slave headset first detects the user voice, determining that the slave headset has the talk right, and the master headset does not have the talk right, or when the slave headset has the talk right, determining that the slave headset has the talk right within the preset time period in which the slave headset does not detect the user voice, and determining that the slave headset does not have the talk right after the preset time period in which the slave headset does not detect the user voice; and in response to the master headset determining that the master headset has a talk right, uploading, by the master headset, the first voice to the electronic device.

10. The method of claim 9, further comprising determining, by the master headset or the electronic device, whether the master headset has the talk right comprising:

after the preset time period in which neither the master headset nor the slave headset detects the user voice, when the master headset first detects the user voice, determining that the master headset has the talk right, and the slave headset does not have the talk right; or after the preset time period in which neither the master headset nor the slave headset detects the user voice, when the slave headset first detects the user voice, determining that the slave headset has the talk right, and the master headset does not have the talk right; or when the master headset has the talk right, determining that the master headset has the talk right within the preset time period in which the master headset does not detect the user voice, and determining that the master headset does not have the talk right after the preset time period in which the master headset does not detect the user voice.

11. The method of claim 9, further comprising:
receiving, by the slave headset, a first translation result through the master headset, and playing the first translation result, wherein the first translation result is a result obtained by the electronic device by automatically translating the first voice according to a setting for mutual translation between languages.

12. The method of claim 11, further comprising:
detecting, by the slave headset, a second voice;
automatically picking up, by the slave headset, the second voice in response to detecting the second voice;
requesting, by the slave headset, the talk right from the master headset; and
when the slave headset receives, from the master headset, a determining result that the slave headset has the talk right, uploading, by the slave headset, the second voice to the electronic device through the master headset, causing the electronic device to automatically translate the second voice according to the setting for mutual translation between languages, and send, to the master headset for playing, a translation result obtained by translating the second voice.

13. The method according to claim 12, wherein the slave headset receiving, from the master headset, the determining result that the slave headset has the talk right comprises:
sending, by the master headset, the determining result to the slave headset when the master headset determines that the slave headset has the talk right; or
performing the following:
requesting, by the master headset, the talk right of the slave headset from the electronic device;
receiving, by the master headset, the determining result that the electronic device determines that the slave headset has the talk right; and
sending, by the master headset, the determining result to the slave headset.

14. A master headset, comprising:
a processor; and
a memory with program code stored thereon, wherein the program code, when executed by the processor, enables the master headset to perform the steps of:
detecting a first voice, wherein the master headset and a slave headset are configured to be connected to an electronic device, the master headset is configured to directly communicate with the electronic device, and the slave headset is configured to communicate with the electronic device through the master headset;
automatically picking up the first voice in response to detecting the first voice;
determining whether the master headset has a talk right by:
after a preset time period in which neither the master headset nor the slave headset detects a user voice, when the master headset first detects the user voice, determining that the master headset has the talk right, and the slave headset does not have the talk right, or
after the preset time period in which neither the master headset nor the slave headset detects the user voice, when the slave headset first detects the user voice, determining that the slave headset has the talk right, and the master headset does not have the talk right, or
when the master headset has the talk right, determining that the master headset has the talk right within the preset time period in which the master headset does not detect the user voice, and determining that the master headset does not have the talk right after the preset time period in which the master headset does not detect the user voice; and
in response to the master headset determining that the master headset has the talk right, uploading, by the master headset, the first voice to the electronic device; and
forwarding a first translation result obtained from the electronic device to the slave headset, wherein the first translation result is a result obtained by the electronic device by automatically translating the first voice according to a setting for mutual translation between languages.

15. The master headset of claim 14, wherein the program code, when executed by the processor, enables the master headset to further perform the steps of:
requesting the talk right from the electronic device; and
receiving a result, returned by the electronic device, of determining whether the master headset has the talk right.

16. The master headset of claim 14, wherein the program code, when executed by the processor, enables the master headset to further perform the steps of:
sending the determining result to the slave headset when the master headset determines that the slave headset has the talk right; or
performing the following:
requesting the talk right of the slave headset from the electronic device;
receiving the determining result that the electronic device determines that the slave headset has the talk right; and
sending the determining result to the slave headset.

17. The master headset of claim 16, wherein the program code, when executed by the processor, enables the master headset to further perform the steps of:
after the preset time period in which neither the master headset nor the slave headset detects the user voice, when the master headset first detects the user voice, determining that the master headset has the talk right, and the slave headset does not have the talk right; or
after the preset time period in which neither the master headset nor the slave headset detects the user voice, when the slave headset first detects the user voice, determining that the slave headset has the talk right, and the master headset does not have the talk right; or
when the slave headset has the talk right, determining that the slave headset has the talk right within the preset time period in which the slave headset does not detect the user voice, and determining that the slave headset does not have the talk right after the preset time period in which the slave headset does not detect the user voice.

18. A master headset, comprising:
a processor; and
a memory with program code stored thereon, wherein the program code, when executed by the processor, enables the master headset to perform the steps of:
detecting a first voice, wherein the master headset and a slave headset are configured to be connected to an electronic device, the master headset is configured to directly communicate with the electronic device, and the slave headset is configured to communicate with the electronic device through the master headset;

automatically picking up the first voice in response to detecting the first voice;

determining whether the slave headset has a talk right by:
- after a preset time period in which neither the master headset nor the slave headset detects a user voice, when the master headset first detects the user voice, determining that the master headset has the talk right, and the slave headset does not have the talk right, or
- after the preset time period in which neither the master headset nor the slave headset detects the user voice, when the slave headset first detects the user voice, determining that the slave headset has the talk right, and the master headset does not have the talk right, or
- when the slave headset has the talk right, determining that the slave headset has the talk right within the preset time period in which the slave headset does not detect the user voice, and determining that the slave headset does not have the talk right after the preset time period in which the slave headset does not detect the user voice; and forwarding a first translation result obtained from the electronic device to the slave headset, wherein the first translation result is a result obtained by the electronic device by automatically translating the first voice according to a setting for mutual translation between languages.

19. The master headset of claim 18, wherein the program code, when executed by the processor, enables the master headset to further perform the steps of:
- requesting the talk right from the electronic device; and
- receiving a result, returned by the electronic device, of determining whether the master headset has the talk right.

20. The master headset of claim 18, wherein the program code, when executed by the processor, enables the master headset to further perform the steps of:
- sending a determining result to the slave headset when the master headset determines that the slave headset has the talk right; or
- performing the following:
    - requesting the talk right of the slave headset from the electronic device;
    - receiving the determining result that the electronic device determines that the slave headset has the talk right; and
    - sending the determining result to the slave headset.

* * * * *

UNITED STATES PATENT AND TRADEMARK OFFICE
CERTIFICATE OF CORRECTION

| | | |
|---|---|---|
| PATENT NO. | : 12,058,486 B2 | Page 1 of 1 |
| APPLICATION NO. | : 17/278008 | |
| DATED | : August 6, 2024 | |
| INVENTOR(S) | : Luo et al. | |

It is certified that error appears in the above-identified patent and that said Letters Patent is hereby corrected as shown below:

In the Claims

In Column 38, in Claim 9, Line 49, delete "has a" and insert -- has the --.

Signed and Sealed this
First Day of October, 2024

Katherine Kelly Vidal
*Director of the United States Patent and Trademark Office*